United States Patent
You et al.

(10) Patent No.: US 11,116,013 B2
(45) Date of Patent: Sep. 7, 2021

(54) PERFORMING RANDOM ACCESS PROCEDURE VIA UPLINK (UL) COMPONENT CARRIERS IN 5G NEW RADIO (NR)

(71) Applicant: Huawei Technologies Co., Ltd., Shenzhen (CN)

(72) Inventors: Chunhua You, Shanghai (CN); Qufang Huang, Shanghai (CN); Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/677,304

(22) Filed: Nov. 7, 2019

(65) Prior Publication Data

US 2020/0077451 A1    Mar. 5, 2020

Related U.S. Application Data

(63) Continuation of application No. PCT/CN2018/091661, filed on Jun. 15, 2018.

(30) Foreign Application Priority Data

Jun. 16, 2017  (CN) .......................... 201710459722.7

(51) Int. Cl.
*H04W 74/08* (2009.01)
*H04W 52/24* (2009.01)
(Continued)

(52) U.S. Cl.
CPC ..... *H04W 74/0833* (2013.01); *H04W 52/242* (2013.01); *H04W 52/365* (2013.01); *H04W 72/0453* (2013.01)

(58) Field of Classification Search
CPC combination set(s) only.
See application file for complete search history.

(56) References Cited

U.S. PATENT DOCUMENTS

| | | |
|---|---|---|
| 2010/0226295 A1 | 9/2010 | Sun et al. |
| 2011/0235534 A1 | 9/2011 | Ratasuk et al. |

(Continued)

FOREIGN PATENT DOCUMENTS

| | | |
|---|---|---|
| CN | 101005308 A | 7/2007 |
| CN | 102845015 A | 12/2012 |

(Continued)

OTHER PUBLICATIONS

U.S. Appl. No. 62/491,013, filed April 27, 2017.*

(Continued)

*Primary Examiner* — Ian N Moore
*Assistant Examiner* — Rushil Parimal Sampat
(74) *Attorney, Agent, or Firm* — Slater Matsil, LLP

(57) ABSTRACT

Embodiments disclose a random access method, a device, and a system, and relate to the field of communications technologies, to resolve a problem of how to implement network access when two or more uplink frequency bands exist in a 5G system. A specific solution is as follows: A terminal receives, from an access network device, random access configurations corresponding to at least two uplink frequency bands, and initiates random access based on at least one of the random access configurations corresponding to the at least two uplink frequency bands. The embodiments are used for a random access process.

17 Claims, 12 Drawing Sheets

(51) Int. Cl.
*H04W 52/36* (2009.01)
*H04W 72/04* (2009.01)

(56) References Cited

U.S. PATENT DOCUMENTS

| | | | | |
|---|---|---|---|---|
| 2015/0181546 A1* | 6/2015 | Freda | ............... | H04L 27/0014 370/336 |
| 2016/0192376 A1 | 6/2016 | Lee et al. | | |
| 2018/0316481 A1* | 11/2018 | Montojo | ............... | H04L 5/14 |

FOREIGN PATENT DOCUMENTS

| | | |
|---|---|---|
| CN | 103716895 A | 4/2014 |
| CN | 107820728 A | 3/2018 |
| WO | 2017079057 A1 | 5/2017 |

OTHER PUBLICATIONS

"Considerations on TA Maintaining in HF Cell," Source: Huawei, HiSilicon, Agenda Item: 10.3.1.4, Document for: Discussion and Decision, 3GPP TSG-RAN WG2 Meeting #98, R2-17046611, May 15-19, 2017, 4 pages.

* cited by examiner

PERFORMING RANDOM ACCESS PROCEDURE VIA UPLINK (UL) COMPONENT CARRIERS IN 5G NEW RADIO (NR)

CROSS-REFERENCE TO RELATED APPLICATIONS

This application is a continuation of International Application No. PCT/CN2018/091661, filed on Jun. 15, 2018, which claims priority to Chinese Patent Application No. 201710459722.7, filed on Jun. 16, 2017. The disclosures of the aforementioned applications are hereby incorporated by reference in their entireties.

TECHNICAL FIELD

Embodiments of this application relate to the field of communications technologies, and in particular, to a random access method, a device, and a system.

BACKGROUND

A 5th-generation (5G) system uses a most advanced mobile communications technology, and can provide higher bandwidth and securer communication for mobile users.

As mobile communications technologies develop, it has become difficult for current spectrum resources to meet increasing capacity requirements of users. When frequency band resources are insufficient, a high frequency band with higher available bandwidth becomes a candidate frequency band of the 5G system. In addition, to meet requirements of most users (especially edge users) for signal transmission coverage and high communication quality, in the 5G system, a low frequency band is also expected for uplink transmission. However, in the prior art, a fixed low frequency band is usually used for uplink transmission, and a transmission rate is low.

SUMMARY

Embodiments of this application provide a random access method, a device, and a system.

According to a first aspect, an embodiment of this application provides a random access method, including: receiving, by a terminal from an access network device, random access configurations corresponding to at least two uplink frequency bands, and initiating random access based on at least one of the random access configurations corresponding to the at least two uplink frequency bands, where center frequencies of all of the at least two uplink frequency bands are different.

According to the random access method provided in this embodiment of this application, the terminal may initiate random access based on different uplink frequency bands, perform uplink transmission, and determine a proper uplink frequency band based on different transmission scenarios, thereby increasing a transmission rate, and meeting a requirement of a user for a large capacity.

The at least two uplink frequency bands may belong to a same cell managed by the access network device, and a random access configuration corresponding to each uplink frequency band may include at least one of the following parameters: a root sequence index, a random access time-frequency resource, a power ramp step, a maximum quantity of preamble sequence transmissions, a size of a random access response window, and duration of a contention resolution information timer.

With reference to the first aspect, in a possible implementation, the initiating, by a terminal, random access based on at least one of the random access configurations corresponding to the at least two uplink frequency bands may include: determining, by the terminal based on a downlink path loss status, to initiate random access based on one of the random access configurations corresponding to the at least two uplink frequency bands.

Specifically, the determining, by the terminal based on a downlink path loss status, to initiate random access based on one of the random access configurations corresponding to the at least two uplink frequency bands may include: obtaining, by the terminal, a downlink path loss, where when the downlink path loss is greater than a path loss threshold, it indicates that the downlink path loss is relatively high, and the terminal may initiate random access based on a random access configuration of a lower frequency band, for example, the terminal may initiate random access based on a first random access configuration, where the first random access configuration corresponds to a first uplink frequency band, the first uplink frequency band is any uplink frequency band in a first uplink frequency band group, the first uplink frequency band group includes at least one uplink frequency band, and a center frequency of each uplink frequency band in the first uplink frequency band group is less than a first preset threshold; or when the downlink path loss is less than or equal to a path loss threshold, it indicates that the downlink path loss is relatively low, and the terminal may initiate random access based on a random access configuration of a relatively high frequency band, for example, the terminal may initiate random access based on a second random access configuration, where the second random access configuration corresponds to a second uplink frequency band, the second uplink frequency band is any uplink frequency band in a second uplink frequency band group, the second uplink frequency band group includes at least one uplink frequency band, a center frequency of each uplink frequency band in the second uplink frequency band group is greater than a second preset threshold, and the second preset threshold is greater than the first preset threshold.

The terminal may obtain the downlink path loss with reference to the prior art. For example, the terminal may obtain the downlink path loss by calculating reference signal received power. This is not limited in this embodiment of this application.

The path loss threshold, the first preset threshold, and the second preset threshold may be set depending on a requirement. This is not limited in this embodiment of this application. Optionally, when a center frequency of the uplink frequency band is less than the first preset threshold, it indicates that the uplink frequency band is a low frequency band; or when a center frequency of the uplink frequency band is greater than the second preset threshold, it indicates that the uplink frequency band is a high frequency band.

In this way, with reference to the downlink path loss, the terminal may initiate random access by using a random access configuration corresponding to a lower frequency band, when the downlink path loss is relatively high, and initiate random access by using a random access configuration corresponding to a higher frequency band, when the downlink path loss is relatively low, to improve quality of random access and quality of subsequent uplink transmission.

With reference to the foregoing possible implementation, in another possible implementation, after the terminal successfully initiates random access based on a random access configuration corresponding to any uplink frequency band, the method may further include: performing, by the terminal, uplink transmission on the uplink frequency band.

With reference to the foregoing possible implementations, in another possible implementation, after the terminal fails to initiate random access based on a random access configuration corresponding to any uplink frequency band, the method may further include: recording, by the terminal, a quantity of random access failures and message sending and receiving statuses in a process in which the random access fails; and sending, by the terminal, the quantity of random access failures and the message sending and receiving statuses in the process in which the random access fails, to the access network device.

A random access failure may mean: A quantity of times that random access is initiated based on a same random access configuration is greater than or equal to a preset quantity of times in a continuous period of time, or duration of random access initiated by the terminal based on a random access configuration is greater than or equal to preset duration, in other words, the random access times out. The preset quantity of times and the preset duration may be set depending on a requirement. This is not limited in this embodiment of this application. When a quantity of times of random access re-initiation is greater than or equal to the preset quantity of times, it indicates that the quantity of times of random access re-initiation reaches a maximum threshold, and it is determined that the random access fails. When duration of the random access is greater than or equal to the preset duration, it indicates that the duration of the random access is relatively long and the random access is in a timeout state, and it is determined that the random access fails.

Optionally, the terminal may send a quantity of random access failures and message sending and receiving statuses in the process in which the random access fails, to the access network device in minimization of drive tests.

In this way, for any process in which random access fails, the terminal may report a related status of a random access failure to the access network device, so that the access network device performs network planning and network optimization based on a quantity of random access failures reported by the terminal and message sending and receiving statuses in the process in which the random access fails, to improve overall network performance.

With reference to the foregoing possible implementations, in another possible implementation, after the terminal fails to initiate random access based on a second random access configuration, the method may further include:

The terminal initiates random access based on a third random access configuration, where the third random access configuration corresponds to a third uplink frequency band, and the third uplink frequency band is any uplink frequency band in the first uplink frequency band group.

To be specific, after the terminal fails to initiate random access based on a random access configuration corresponding to the high frequency band, the terminal may initiate random access by using a random access configuration corresponding to any low frequency band, to improve random access quality.

With reference to the first aspect, in a possible implementation, the terminal may initiate random access based on at least two of the random access configurations corresponding to the at least two uplink frequency bands, to initiate random access simultaneously on two uplink frequency bands, so as to accelerate random access of the terminal.

With reference to the foregoing possible implementations, in another possible implementation, after the terminal successfully initiates random access based on at least two random access configurations, the method may further include: performing, by the terminal, uplink transmission based on one or more or all of the at least two uplink frequency bands.

In this way, the terminal can perform uplink transmission based on a same uplink frequency band or different uplink frequency bands, thereby improving uplink transmission flexibility.

With reference to the foregoing possible implementations, in another possible implementation, after the terminal successfully initiates random access based on the at least two random access configurations, the terminal may determine, in the following manner (1) or manner (2), to perform uplink transmission based on an uplink frequency band.

Manner (1): The terminal determines a first identifier from at least two identifiers based on scrambled information obtained from the access network device, where the scrambled information is scrambled by using any one of the at least two identifiers, all of the at least two identifiers are different, the at least two identifiers are in a one-to-one correspondence with the at least two uplink frequency bands, and each of the at least two identifiers is an identifier obtained from the access network device when the terminal initiates random access based on a random access configuration corresponding to the identifier; and the terminal performs uplink transmission based on the uplink frequency band corresponding to the first identifier.

Optionally, that the terminal determines a first identifier from at least two identifiers based on scrambled information obtained from the access network device may be as follows: The terminal descrambles the scrambled information by using each of the at least two identifiers, and determines an identifier that successfully descrambles the scrambled information, as the first identifier. For scrambling and descrambling processes in this embodiment of this application, refer to a scrambling and descrambling process in the prior art. Details are not described herein.

Manner (2): The terminal itself determines an uplink frequency band used for uplink transmission, and sends an indication that includes an uplink frequency band index to the access network device, to indicate the uplink frequency band to be used when the terminal performs uplink transmission.

For example, after successfully initiating random access based on random access configurations of an uplink frequency band 1, an uplink frequency band 2, and an uplink frequency band 3, the terminal may report the uplink frequency band 1 to the access network device before performing uplink transmission on the uplink frequency band 1, so that the access network device learns which uplink frequency band is used by the terminal to perform transmission, to improve accuracy of receiving by the access network device.

With reference to the foregoing possible implementations, in another possible implementation, to reduce storage load of the terminal, after determining the uplink frequency band used for uplink transmission, the terminal may eliminate, in the following manner, some information that is stored in the terminal and that is related to another uplink frequency band not used for uplink transmission: eliminating (clear), by the terminal, an identifier other than a second identifier obtained by the terminal, where the second identifier is an identifier corresponding to the uplink frequency band used by the terminal to perform uplink transmission; or clearing (flush), by the terminal, a hybrid automatic repeat request (HARQ) buffer of a HARQ process used when the terminal initiates random access based on a random access configuration corresponding to another uplink frequency band other than a fourth uplink frequency band, where the fourth uplink frequency band is the uplink frequency band used by the terminal to perform uplink transmission.

With reference to the foregoing possible implementations, in another possible implementation, when the terminal performs uplink transmission based on a plurality of uplink frequency bands, the terminal may further maintain a timing advance corresponding to each uplink frequency band, to implement uplink synchronization. A specific implementation is as follows: the terminal stores at least one time group of at least one cell, where each time group corresponds to one time amount, one timer, and at least one uplink frequency band, the at least one cell is a cell managed by the access network device, the time amount is used by the terminal to perform uplink synchronization, and the timer is used to limit an effective time of the time amount; and for any one of the at least one cell, when a timer corresponding to any time group of the cell expires, it indicates that a time amount corresponding to the time group is invalid, and the terminal cannot implement uplink synchronization when performing uplink transmission based on the time amount, and therefore, the terminal stops uplink transmission on an uplink frequency band corresponding to the time group; or for any one of the at least one cell, when timers corresponding to all time groups of the cell expire, it indicates that time amounts corresponding to all time groups of the cell are unavailable, and interference caused to other uplink transmission when the terminal performs uplink transmission based on the time amount corresponding to the time group of the cell needs to be prevented, and therefore the terminal clears a hybrid automatic repeat request buffer corresponding to the cell; or when timers corresponding to all time groups of a primary cell in the at least one cell expire, the terminal clears a hybrid automatic repeat request buffer corresponding to another cell, in the at least one cell, other than the primary cell, and determines that timers corresponding to all time groups of the another cell expire; and after the terminal receives a time amount adjustment command from the access network device, the terminal starts, based on the time amount adjustment command, a timer corresponding to a first time group of a first cell, where the time amount adjustment command is used to instruct the terminal to adjust the timer corresponding to the first time group of the first cell.

The time amount may be a timing advance (TA), and may be configured by the access network device for the terminal. The timer may be a timing advance timer (TAT), and the timer may be configured by the access network device for the terminal depending on a requirement. This is not limited in this embodiment of this application.

It should be noted that, in this embodiment of the present invention, a serving cell is a cell that can be used to provide a radio resource for a terminal in a connected mode. If neither carrier aggregation (CA) nor dual connectivity (DC) is configured, only one serving cell is connected to the terminal. If a CA and/or a DC are/is configured on a terminal in a connected mode, there are at least one serving cell, including a primary cell (PCell) and all secondary cells (SCell). The PCell is a cell that works at a primary frequency, in which the terminal may perform an initial connection establishment process or initiate a connection re-establishment process, or is indicated as a primary cell in a handover process. The SCell is a cell that works at a secondary frequency and provides an additional radio resource for the terminal in a connected mode. An activated serving cell is a serving cell that can be used for data transmission. A primary secondary cell (PSCell) is a cell in which random access may be initiated when a secondary cell of a secondary base station changes. A physical uplink control channel (PUCCH) SCell is an SCell in which a PUCCH is configured.

In this way, the terminal can implement uplink synchronization between different uplink frequency bands based on the foregoing maintenance on a time amount corresponding to each uplink frequency band.

With reference to the foregoing possible implementations, in another possible implementation, when performing uplink transmission based on a plurality of uplink frequency bands, the terminal may further perform uplink transmission based on an indication of the access network device by using a resource corresponding to an uplink frequency band. A specific implementation of the uplink transmission may include: the terminal receives, from the access network device, a first indication that includes a first uplink frequency band index and a transmission resource corresponding to an uplink frequency band identified by the first uplink frequency band index, and performs uplink transmission based on the first indication.

The first uplink frequency band may be any one of the at least two uplink frequency bands.

In this way, the terminal can implement uplink transmission on the transmission resource indicated by the access network device.

With reference to the foregoing possible implementations, in another possible implementation, when implementing uplink transmission on the transmission resource indicated by the access network device, the terminal may further send a power headroom report (PHR) to the access network device, so that the access network device selects a proper scheduling policy. Specifically, the implementation may include: when the UE is in a PHR triggering state, the UE generates a PHR based on the first indication, and sends the PHR to the access network device when performing uplink transmission based on the first indication.

The PHR includes an uplink frequency band index and a power headroom of an uplink frequency band identified by the uplink frequency band index. Optionally, the terminal enters the power headroom report triggering state when a trigger condition is met, and the trigger condition may include any one of the following conditions: a first timer expires, and a path loss change value of at least one reference service downlink beam of a serving cell of the terminal is greater than a first threshold, where the first timer is used to prevent the terminal from continuously triggering a PHR; a first timer expires, power back-off occurs on at least one serving uplink beam of a serving cell of the terminal, and a back-off value of the power back-off exceeds a second threshold, where the first timer is used to prevent the terminal from continuously triggering a PHR; a second timer expires, where the second timer is used to periodically trigger a PHR and the second timer is configured in correspondence with a beam of a serving cell of the terminal; and at least one uplink serving beam of the serving cell of the terminal is activated.

In this embodiment of this application, the first threshold and the second threshold may be set by the access network device depending on a requirement or may be a default value. Duration of the first timer and duration of the second timer may be configured by the access network device or be default values.

It should be explained that in this embodiment of this application, that the at least one serving uplink beam of a serving cell of the terminal is activated may be understood as that the at least one serving uplink beam of the serving cell of the terminal is configured, or may be understood as that the at least one serving uplink beam of the serving cell of the terminal is added.

In this way, when performing uplink transmission on an uplink frequency band, the terminal may report a power headroom of the uplink frequency band to the access network device, so that the access network device performs a proper scheduling policy on the uplink frequency band based on the power headroom.

With reference to the foregoing possible implementations, in another possible implementation, when performing uplink transmission based on a plurality of uplink frequency bands, the terminal may further perform uplink transmission by using transport blocks corresponding to the uplink frequency bands based on another indication of the access network device, and determine which transport block is used to transmit uplink control information. A specific implementation of the uplink transmission may include: the terminal receives at least two second indications from the access network device, where each of the at least two second indications may include a second uplink frequency band index, and a transport block corresponding to an uplink frequency band identified by the second uplink frequency band index; and the terminal performs uplink transmission based on the at least two second indications, and transmits, according to a preset rule or based on a configuration of the access network device, uplink control information (uplink control information, UCI) on one of transport blocks included in the at least two second indications.

The transport block may be a medium access control (MAC) packet, for example, may be a MAC protocol data unit (PDU). The UCI may include at least one of a scheduling request (SR), channel state information, HARQ feedback, and a beam report. The scheduling request is used to request an uplink transmission resource from the access network device; the channel state information is used to notify the access network device of a channel state; and the HARQ feedback is used to notify the access network device of a downlink data decoding status (for example, decoding succeeds or fails).

The preset rule is used to determine a transport block for transmitting the UCI, and may be preconfigured by the access network device for the terminal. For example, the preset rule may be: comparing indexes of at least two uplink frequency bands, and transmitting the UCI by using a transport block corresponding to an uplink frequency band with a largest or a smallest index.

In this way, the terminal can transmit the UCI by using one transport block while sending the transport block on two uplink frequency bands.

With reference to the foregoing possible implementations, in another possible implementation, the method may further include: receiving, by the terminal from the access network device, a power adjustment command that includes an uplink frequency band index and a power control parameter, where the power adjustment command is used to request the access network device to perform power adjustment on an uplink frequency band identified by the uplink frequency band index; and calculating, by the UE, uplink power of an uplink frequency band identified by the uplink frequency band index based on the power adjustment command, and performing uplink transmission based on the uplink power obtained through calculation.

Optionally, the terminal may calculate the uplink power based on the power control parameter, a path loss measured by the terminal, and an existing power control formula. Specifically, for a calculation process of the terminal, refer to the prior art. Details are not described herein.

In this way, the terminal can adjust power of an uplink frequency band by using a command of the access network device.

With reference to the foregoing possible implementations, in another possible implementation, when the terminal performs uplink transmission based on a plurality of uplink frequency bands, the method may further include: receiving, by the terminal, an activation command from the access network device, where the activation command includes a first uplink frequency band index, and activating, by the terminal, an uplink frequency band identified by the first uplink frequency band index; or receiving, by the terminal, a deactivation command from the access network device, where the deactivation command includes a second uplink frequency band index, and deactivating, by the terminal, an uplink frequency band identified by the second uplink frequency band index.

In this way, the terminal can determine, based on the activation and deactivation commands sent by the access network device, which uplink frequency band is activated or deactivated, and which uplink frequency band is not activated or deactivated.

With reference to the foregoing possible implementations, in another possible implementation, when the terminal moves from a coverage area of one access network device to a coverage area of another access network device, the method may further include: receiving, by the terminal, a handover command from the access network device, where the handover command is used to instruct the terminal to randomly access an uplink frequency band of another access network device and a random access resource corresponding to the uplink frequency band; and initiating, by the terminal, random access to the access network device based on the handover command.

In this way, the terminal can well implement random access in a moving process according to a handover command sent by the access network device.

With reference to the first aspect and the foregoing possible implementations, in another possible implementation, the random access in this embodiment of this application may specifically include: receiving, by the terminal, a random access response from the access network device after a preamble sequence has been sent by the terminal for a period of time.

The period of time depends on a processing speed of the access network device, and is configured by the access network device, or is set based on a reference air interface format supported by a serving cell of the terminal. The period of time may be an integer multiple of a transmission time interval (TTI) length. For example, for a TTI length of 0.1 ms, the period of time may be 25*0.1 ms; and for a TTI length of 1 ms, the period of time may be 3*1 ms.

The reference air interface format is a parameter set of a subcarrier spacing and a cyclic prefix length. In this embodiment of this application, the reference air interface format may be named numerology.

In this way, the terminal can receive, based on a processing speed of the access network device, a random access response sent by the access network device after a period of time, thereby improving receiving accuracy of the random access response.

According to a second aspect, an embodiment of the present invention provides an access network device, including: configuring, by the access network device, random access configurations corresponding to at least two uplink frequency bands for a terminal, where center frequencies of all of the at least two uplink frequency bands are different.

In this way, the access network device may configure the random access configurations corresponding to the at least two uplink frequency bands for the terminal, so that the terminal initiates random access based on the random access configurations corresponding to the at least two uplink frequency bands.

With reference to the second aspect, in another possible implementation, the method may further include: sending, by the access network device, scrambled information to the terminal, where the scrambled information is scrambled by using any one of at least two identifiers, the at least two identifiers are in a one-to-one correspondence with the at least two uplink frequency bands, and each of the at least two identifiers is an identifier obtained from the access network device when the terminal initiates random access based on a random access configuration corresponding to the identifier.

In this way, the access network device may send the scrambled information to the terminal, so that the terminal determines, based on the scrambled information, an uplink frequency band used for uplink transmission.

With reference to the second aspect and the foregoing possible implementations, in another possible implementation, the method may further include: sending, by the access network device, a time amount adjustment command to the terminal, where the time amount adjustment command is used to instruct the terminal to adjust a timer corresponding to a first time group of a first cell.

In this way, the access network device may send the time amount adjustment command to the terminal, so that the terminal determines an uplink transmission time amount based on the time amount adjustment command, to implement uplink synchronization.

With reference to the second aspect and the foregoing possible implementations, in another possible implementation, the method further includes: sending, by the access network device, a first indication to the terminal, where the first indication includes a first uplink frequency band index and a transmission resource corresponding to an uplink frequency band identified by the first uplink frequency band index, and the first indication is used to instruct the terminal to perform uplink transmission based on the first indication.

In this way, the access network device may send, to the terminal, the indication indicating the transmission resource, so that the terminal determines the transmission resource for uplink transmission based on the indication.

With reference to the second aspect and the foregoing possible implementations, in another possible implementation, the method further includes: sending, by the access network device, at least two second indications to the terminal, where each of the at least two second indications includes a second uplink frequency band index and a transport block corresponding to an uplink frequency band identified by the second uplink frequency band index.

In this way, the access network device may send, to the terminal, the indication indicating a transmission resource, so that the terminal determines a transport block for uplink transmission and a transport block for transmitting UCI based on the indication.

According to another aspect, an embodiment of this application provides a terminal, where the terminal may include: a receiving unit, adapted to receive, from an access network device, random access configurations corresponding to at least two uplink frequency bands, where center frequencies of all of the at least two uplink frequency bands are different; and a random access unit, adapted to initiate random access based on at least one of the random access configurations, corresponding to the at least two uplink frequency bands, received by the receiving unit.

For a specific implementation of the terminal, refer to behavior functions of the terminal in the random access method provided in the first aspect or the possible implementations of the first aspect. Details are not described herein again. Therefore, the provided terminal may achieve same beneficial effects as those in the first aspect.

According to another aspect, an embodiment of this application provides a terminal, and the terminal can implement a function performed by the terminal in the foregoing method embodiments. The function may be implemented by hardware, or may be implemented by executing corresponding software by hardware. The hardware or the software includes one or more modules corresponding to the function.

In a possible design, a structure of the terminal includes a processor and a transceiver. The processor is adapted to support the terminal in performing a corresponding function in the foregoing method. The transceiver is adapted to support the terminal in communicating with another network element. The terminal may further include a memory and a display, where the memory is coupled to the processor, the memory stores a program instruction and data that are necessary for the terminal, and the display may be used for interaction between the terminal and a user.

According to another aspect, an embodiment of this application provides a computer storage medium, adapted to store a computer software instruction used by the foregoing terminal, where the computer software instruction includes a program designed for performing the foregoing aspects.

According to another aspect, an embodiment of this application provides a computer program product, where the computer program product stores a computer software instruction used by the foregoing terminal, and the computer software instruction includes a program designed for performing the foregoing aspects.

According to another aspect, an embodiment of this application provides an apparatus. The apparatus exists in a product form of a chip. A structure of the apparatus includes a processor and a memory. The memory is coupled to the processor and stores a program instruction and data that are required by the apparatus. The processor is adapted to execute the program instruction stored in the memory, so that the apparatus performs a function corresponding to the terminal in the foregoing method.

According to still another aspect, an embodiment of this application provides an access network device, where the access network device may include: a configuration unit, adapted to configure, for the access network device, random access configurations corresponding to at least two uplink frequency bands, for a terminal, where center frequencies of all of the at least two uplink frequency bands are different.

For a specific implementation of the access network device, refer to behavior functions of the access network device in the random access method provided in the second aspect or the possible implementations of the second aspect.

Details are not described herein again. Therefore, the access network device provided in this aspect can achieve same beneficial effects as those in the second aspect.

According to still another aspect, an embodiment of this application provides an access network device. The access network device can implement a function implemented by the access network device in the foregoing method embodiments. The function may be implemented by hardware, or may be implemented by executing corresponding software by hardware. The hardware or the software includes one or more modules corresponding to the function.

In a possible design, a structure of the access network device includes a processor and a transceiver. The processor is adapted to support the access network device in performing a corresponding function in the foregoing method. The transceiver is adapted to support the access network device in communicating with another network element. The access network device may further include a memory and a display, where the memory is coupled to the processor, the memory stores a program instruction and data that are necessary for the access network device, and the display may be used for interaction between the access network device and a user.

According to still another aspect, an embodiment of this application provides a computer storage medium, adapted to store a computer software instruction used by the foregoing access network device, where the computer software instruction includes a program designed for performing the foregoing aspects.

According to still another aspect, an embodiment of this application provides a computer program product, where the program product stores a computer software instruction used by the foregoing access network device, and the computer software instruction includes a program designed for performing the foregoing aspects.

According to still another aspect, an embodiment of this application provides an apparatus. The apparatus exists in a product form of a chip. A structure of the apparatus includes a processor and a memory. The memory is coupled to the processor and stores a program instruction and data that are required by the apparatus. The processor is adapted to execute the program instruction stored in the memory, so that the apparatus performs a function corresponding to the access network device in the foregoing method.

According to still another aspect, an embodiment of the present invention provides a random access system, where the system includes the terminal in any one of the foregoing aspects and the access network device in any one of the foregoing aspects.

DETAILED DESCRIPTION OF ILLUSTRATIVE EMBODIMENTS

The following describes implementations of embodiments of this application in detail with reference to accompanying drawings.

A random access method provided in the embodiments of the present invention may be applied to any communications system that has two or more uplink frequency bands, for example, a global system for mobile communications (GSM) system, a code division multiple access (CDMA) system, a wideband code division multiple access (WCDMA) system, a general packet radio service (GPRS), a long term evolution (LTE) system, a long term evolution (LTE) frequency division duplex (FDD) system, an LTE time division duplex (TDD) system, a universal mobile telecommunications system (UMTS) system, and a current communications system; and in particular, the method is applied to a future 5G new radio (NR) system, a 5G system, or a communications system based on an orthogonal frequency division multiplexing (OFDM) technology. The following uses an example in which the random access method provided in the embodiments of the present invention is applied to a 5G system shown in FIG. 1, for description.

Figure 1:
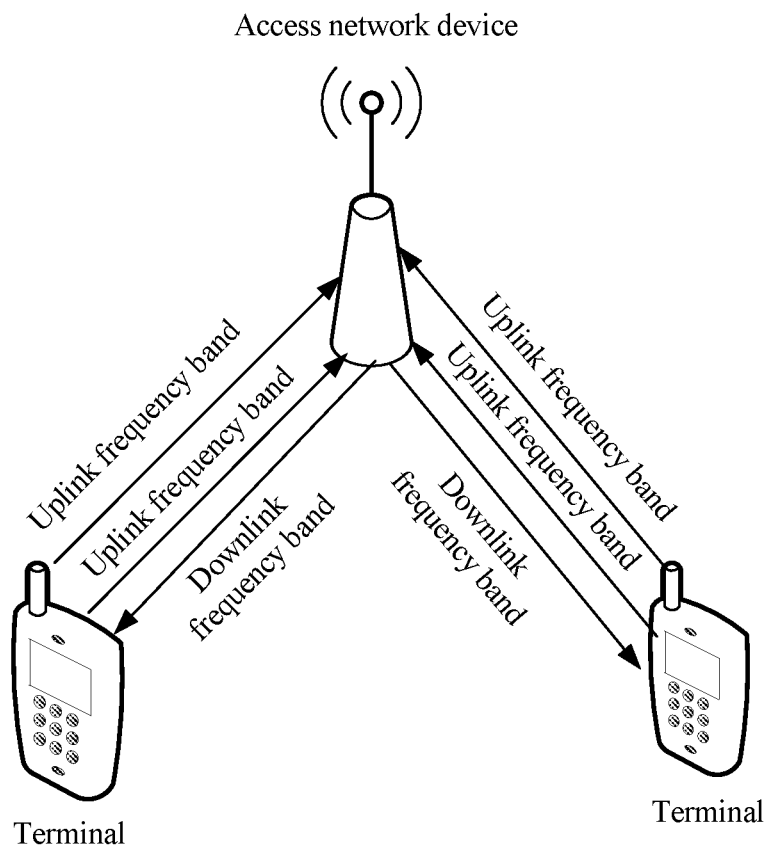
FIG. 1 is a simplified schematic diagram of a system architecture according to an embodiment of this application.

As shown in FIG. 1, the 5G system may include at least one terminal and an access network device. The terminal is in a coverage area of the access network device, the access network device may cover and manage a plurality of cells, and data transmission is performed between the terminal and the access network device by using at least two uplink frequency bands and one downlink frequency band. The at least two uplink frequency bands belong to a same cell, and center frequency bands of all of the at least two uplink frequency bands are different. For example, the at least two uplink frequency bands may include a high frequency band (for example, a frequency band whose center frequency is greater than or equal to 6 GHz) and a low frequency band (for example, a frequency band whose center frequency is less than 6 GHz). It should be noted that, in this embodiment of this application, a high frequency band and a low frequency band are relative concepts. A high frequency band is a frequency band with a relatively high center frequency in at least two uplink frequency bands, and a low frequency band is a frequency band with a relatively low center frequency in the at least two uplink frequency bands. In addition, FIG. 1 is only an example architectural diagram. For ease of description, FIG. 1 shows only two uplink frequency bands. It may be understood that the 5G system may include more than two uplink frequency bands. In addition to the function entities shown in FIG. 1, the 5G system architecture may further include another function entity. This is not limited in this embodiment of this application.

The terminal in FIG. 1 may be user equipment (UE). For example, the terminal may be a cellular phone, a cordless phone, a session initiation protocol (SIP) phone, a smartphone, a wireless local loop (WLL) station, a personal digital assistant (PDA), a laptop computer, a handheld communications device, a handheld computing device, a satellite radio device, a wireless modem card, and/or another device adapted to perform communication in a wireless system. The access network device may be a base transceiver station (BTS) in GSM or CDMA, a NodeB in WCDMA, an evolved NodeB (evolutional Node B, eNB or eNodeB) in LTE, an access node, a next generation NodeB (generation nodeB, gNB), a transmission reception point (transmission receive point, TRP), a transmission point (TP), or another access network device.

Figure 1A:
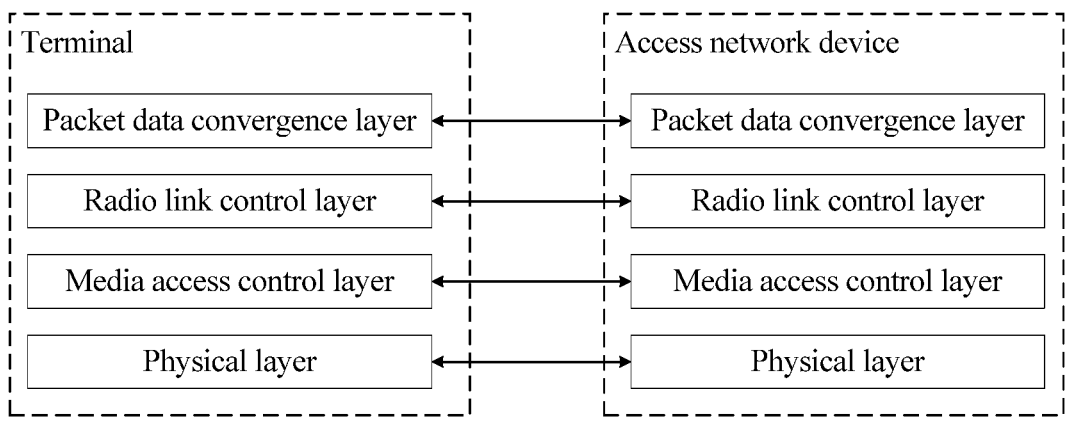
FIG. 1a is a schematic diagram of a user plane protocol stack according to an embodiment of this application.

The terminal and the access network device may transmit data by using a user plane protocol stack shown in FIG. 1a. As shown in FIG. 1a, the terminal and the access network device may each include a packet data convergence protocol (PDCP) layer, a radio link control (RLC) layer, a media access control (MAC) layer, and a physical layer (PHY). The terminal and the access network device transmit data based on these protocol stacks. For example, the PDCP layer of the access network device performs packet header compression and security function (such as integrity protection and encryption) processing on delivered data, and transmits the processed data to the RLC layer. After receiving the data, the RLC layer segments and reassembles the received data, so that a message size obtained through the segmentation and reassembling is adapted to actual transmission performed through a radio interface, and transmits the data obtained through the segmentation and reassembling to the MAC layer. After receiving the data, the MAC layer performs mapping from a logical channel to a transmission channel, and sends the data to the PHY layer by using transmission information. The PHY layer transmits the received data to the terminal by using a transmission channel. After receiving the data, the terminal processes the data by using a protocol stack of the terminal. A protocol stack processing process of the terminal is the same as that of the access network device. Details are not described herein again.

Figure 1B:
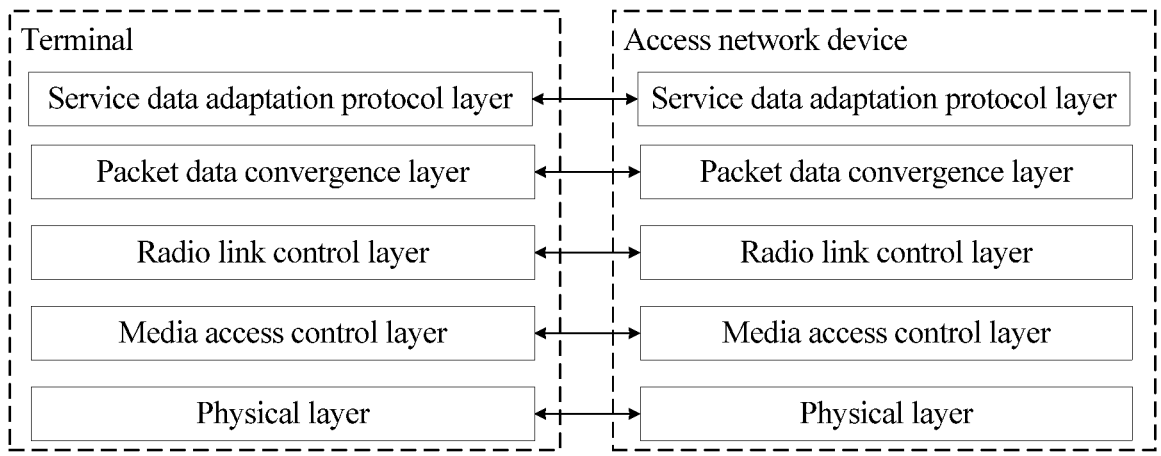
FIG. 1b is a schematic diagram of another user plane protocol stack according to an embodiment of this application.

In another implementable of this embodiment of this application, a service data adaptation protocol (SDAP) layer may be further configured in both the terminal and the access network device. FIG. 1b is a schematic diagram of another user plane protocol stack between a terminal and an access network device. The terminal and the access network device each include an SDAP layer, a PDCP layer, an RLC layer, a MAC layer, and a PHY layer. The terminal and the access network device process data based on these protocol stacks, and the SDAP layer is adapted to map a delivered data stream to a radio bearer. The PDCP layer, the RLC layer, the MAC layer, and the PHY layer are the same as the layers shown in FIG. 1a. Details are not described herein again. It should be noted that FIG. 1a and FIG. 1b are merely schematic diagrams. In addition to the protocol stacks shown in FIG. 1a and FIG. 1b, the terminal and the access network device may further include another protocol layer, such as a radio resource control (RRC) layer. This is not limited in this embodiment of this application.

Figure 2:
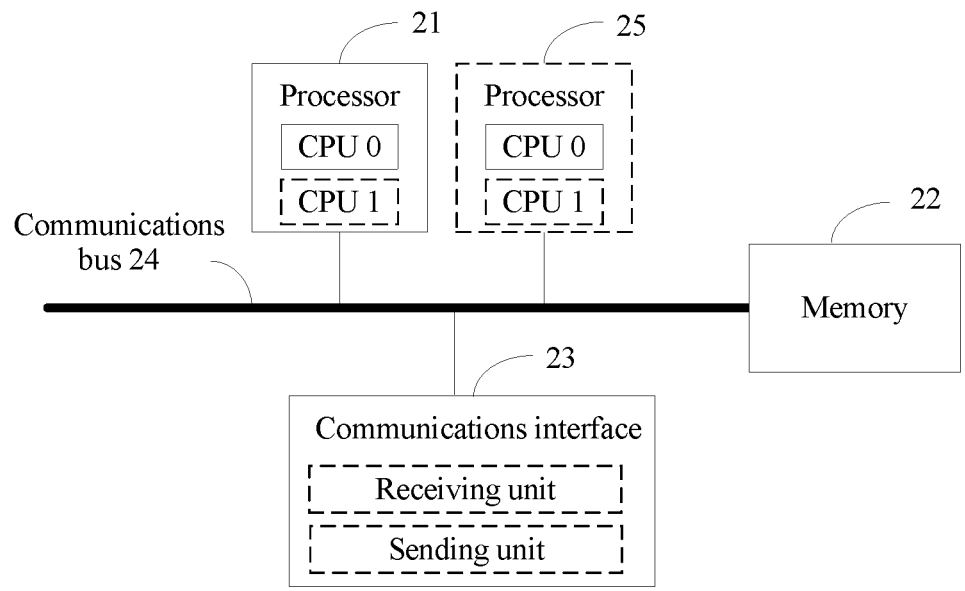
FIG. 2 is a schematic structural diagram schematic structural diagram of a gNB according to an embodiment of this application.

The following describes a random access method provided in the embodiments of this application, only by using an example in which a terminal is UE and an access network device is a gNB. Specifically, FIG. 2 is a schematic structural diagram of a gNB according to an embodiment of this application. As shown in FIG. 2, the gNB may include at least one processor 21, a memory 22, a communications interface 23, and a communications bus 24. The following describes each component of the gNB in detail with reference to FIG. 2.

The processor 21 is a control center of the gNB, and may be a processor, or may be a collective name of a plurality of processing elements. For example, the processor 21 may be a central processing unit (CPU), an application-specific integrated circuit (ASIC), or may be configured as one or more integrated circuits implementing this embodiment of this application, for example, one or more microprocessors (digital signal processor, DSP) or one or more field programmable gate arrays (FPGA). The processor 21 may implement various functions of the gNB by running or executing a software program stored in the memory 22 and invoking data stored in the memory 22.

In specific implementation, in an embodiment, the processor 21 may include one or more CPUs, for example, a CPU 0 and a CPU 1 in FIG. 2. In specific implementation, in an embodiment, the gNB may include a plurality of processors, for example, a processor 21 and a processor 25 shown in FIG. 2. Each of these processors may be a single-core processor (single-CPU), or may be a multi-core processor (multi-CPU). The processor herein may be one or more devices, circuits, and/or processing cores used to process data (such as a computer program instruction).

The memory 22 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 22 is not limited thereto. The memory 22 may exist independently, and be connected to the processor 21 by using a communications bus 24. Alternatively, the memory 22 may be integrated with the processor 21. The memory 22 is adapted to store a software program that performs the solution provided by the embodiments of this application, and the processor 21 controls execution of the software program.

The communications interface 23 is adapted to communicate with another device or a communications network, such as an Ethernet network, a radio access network (RAN), or a wireless local area network (WLAN). The communications interface 23 may include a receiving unit for implementing a receiving function and a sending unit for implementing a sending function.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of denotation, the bus is denoted by using only one bold line in FIG. 2. However, this does not indicate that there is only one bus or only one type of bus.

The gNB shown in FIG. 2 may perform an operation performed by the gNB in the random access method provided in the embodiments of this application. For example, the processor 21 in the gNB may configure, for the terminal, random access configurations corresponding to at least two uplink frequency bands.

Figure 3:
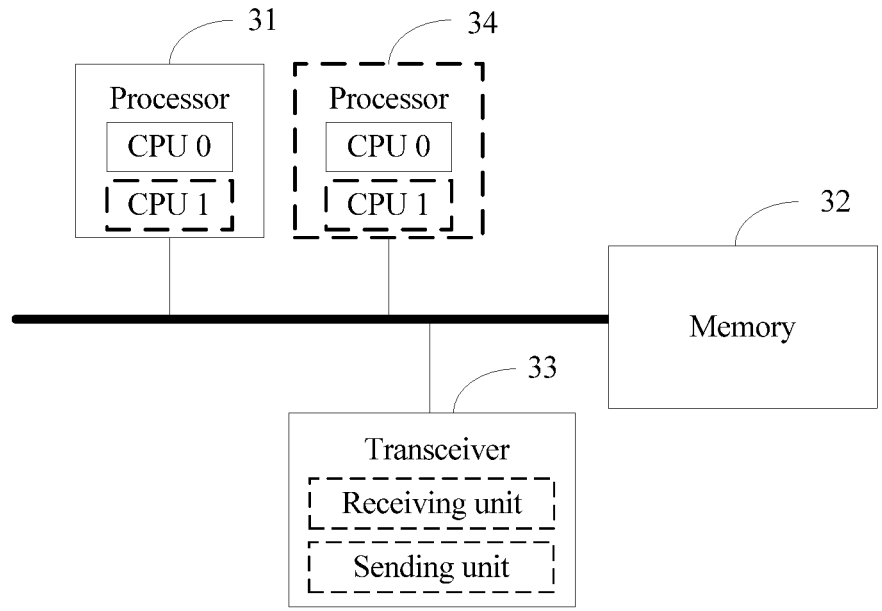
FIG. 3 is a schematic structural diagram of UE according to an embodiment of this application.

FIG. 3 is a schematic structural diagram of UE according to an embodiment of this application. As shown in FIG. 3, the UE may include a processor 31, a memory 32, and a transceiver 33. The following describes each component of the UE in detail with reference to FIG. 3.

The processor 31 is a control center of the UE, and may be a processor, or may be a collective name of a plurality of processing elements. For example, the processor 31 is a CPU, may be an ASIC, or may be one or more integrated circuits such as one or more DSPs or one or more FPGAs adapted to implement the embodiments of this application. The processor 31 may implement various functions of the UE by running or executing a software program stored in the memory 32 and invoking data stored in the memory 32.

In specific implementation, in an embodiment, the processor 31 may include one or more CPUs, for example, a CPU 0 and a CPU 1 in FIG. 3. In specific implementation, in an embodiment, the UE may include a plurality of processors, for example, a processor 31 and a processor 34 shown in FIG. 3. Each of these processors may be a single-CPU processor, or may be a multi-CPU processor. The processor herein may be one or more devices, circuits, and/or processing cores used to process data (such as a computer program instruction).

The memory 32 may be a ROM or another type of static storage device that can store static information and instructions, or a RAM or another type of dynamic storage device that can store information and instructions, or may be an EEPROM, a CD-ROM or another compact disc storage, an optical disc storage (including a compact disc, a laser disc, an optical disc, a digital versatile disc, a Blue-ray disc, and the like), a magnetic disk storage medium or another magnetic storage device, or any other medium that can carry or store expected program code in a form of an instructions or a data structure and that can be accessed by a computer. However, the memory 32 is not limited thereto. The memory 32 may exist independently, and be connected to the processor 31 by using a communications bus 34. Alternatively, the memory 32 may be integrated with the processor 31. The memory 32 is adapted to store a software program that performs the solution of this application, and the processor 31 controls execution of the software program.

The transceiver 33 is adapted to communicate with another device or a communications network, such as an Ethernet network, a RAN, or a WLAN. The transceiver 33 may include a receiving unit for implementing a receiving function and a sending unit for implementing a transmission function, and the transceiver 33 may be a radio frequency module.

A device structure shown in FIG. 3 does not constitute a limitation on the UE. A quantity of included components may be greater or less than that shown in the figure, or some components may be combined, or components may be disposed differently. Although not shown, the UE may further include a battery, a camera, a Bluetooth module, a global positioning system (GPS) module, and the like. Details are not described herein.

The UE shown in FIG. 3 may perform an operation performed by the UE in the random access method provided in the embodiments of this application. For example, the transceiver 33 in the UE may obtain, from a gNB, random access configurations corresponding to at least two uplink frequency bands, and the processor 31 in the UE may initiate random access based on the random access configurations, corresponding to the at least two uplink frequency bands, obtained by the transceiver 33.

With reference to the 5G system shown in FIG. 1, the following uses an example in which the access network device is the gNB shown in FIG. 2 and the UE is the UE shown in FIG. 3, to describe the random access method provided in the embodiments of the present invention. It should be noted that although a logical sequence is shown in the following method flowchart, in some cases, the shown or described steps may be performed in a sequence different from the sequence herein.

Figure 4:
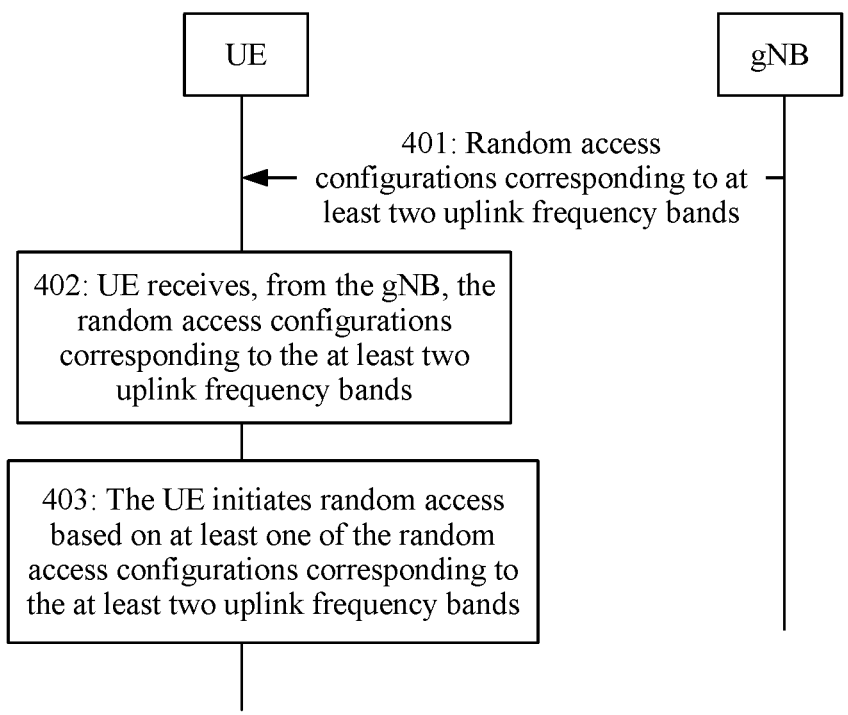
FIG. 4 is a flowchart of a random access method according to an embodiment of this application.

FIG. 4 is a flowchart of a random access method according to an embodiment of this application. The method is performed by the UE shown in FIG. 3 and the gNB shown in FIG. 2 through interaction. As shown in FIG. 4, the method may include the following steps.

Step 401: The gNB configures random access configurations corresponding to at least two uplink frequency bands, for the UE.

Center frequency bands of all of the at least two uplink frequency bands are different, and the at least two uplink frequency bands may belong to a same cell managed by the gNB.

A random access configuration of each uplink frequency band may include at least one of the following parameters: a root sequence index, where the root sequence index is used to generate a preamble sequence; a random access time-frequency resource, where the random access time-frequency resource is used to send the preamble sequence; a power ramp step, where the power ramp step is used for power control of the preamble sequence; a maximum quantity of preamble sequence transmissions, where the maximum quantity of preamble sequence transmissions is used to identify a random access problem, and when the maximum quantity of transmissions is reached, the terminal device determines that a random access problem occurs; a size of a random access response window, where the random access response window is used to receive a random access response message; and duration of a contention resolution information timer, where the contention resolution information timer is used to receive contention resolution information.

Optionally, the gNB may proactively configure, by using a radio resource control (RRC) message or another message, the random access configurations corresponding to the at least two uplink frequency bands, for the UE. The random access configurations corresponding to the at least two uplink frequency bands may be carried in one RRC message and delivered to the UE, or may be separately carried in two different messages and delivered to the UE.

Step 402: The UE receives, from the gNB, the random access configurations corresponding to the at least two uplink frequency bands.

For example, the UE receives, from the gNB, indexes of the at least two uplink frequency bands and the random access configurations corresponding to the indexes of the at least two uplink frequency bands.

Step 403: The UE initiates random access based on at least one of the random access configurations corresponding to the at least two uplink frequency bands.

In comparison with the prior art, in the random access method shown in FIG. 4, the UE may initiate random access based on different uplink frequency bands, perform uplink transmission, and determine proper uplink frequency bands based on different transmission scenarios, thereby increasing transmission efficiency and meeting a requirement of a user for a large capacity.

Figure 4A:
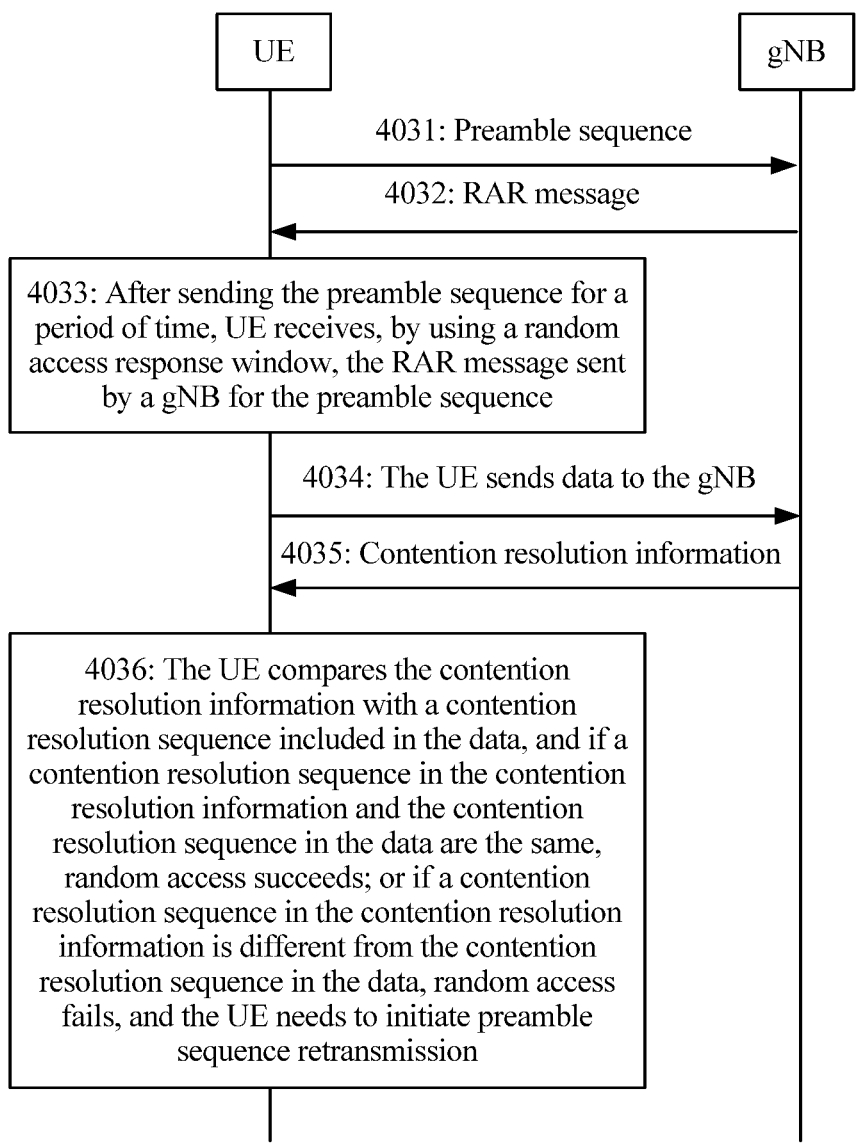
FIG. 4a is a schematic diagram of a random access process according to an embodiment of this application.

In step 403, for a process in which the UE initiates random access, refer to existing contention-based 4-step random access, existing non-contention-based 3-step random access, or a process shown in FIG. 4a. FIG. 4a is a random access process according to an embodiment of the present invention. The random access process may include the following steps.

Step 4031: The UE sends a preamble sequence to the gNB.

The preamble sequence may be referred to as a msg1 (message 1).

Optionally, the UE may generate a preamble sequence based on a root sequence index in the random access configurations, and send the preamble sequence to the gNB by using a random access time-frequency resource.

Optionally, the preamble sequence may be further used to indicate a UE capability, and the UE capability is a quantity of uplink frequency bands that can be supported by the UE.

Step 4032: The gNB receives the preamble sequence from the UE, and sends a random access response (random access response, RAR) message for the preamble sequence to the UE.

The RAR message may be referred to as a msg2 (message 2). The RAR message may include an uplink grant and an uplink TA, and may further include a temporary cell radio network temporary identifier (TC-RNTI) and another message. The TC-RNTI is an identifier of the UE in the cell, and is used to identify the UE.

Step 4033: After sending the preamble sequence for a period of time, the UE receives, by using the random access response window, the RAR message that is sent by the gNB and that is for the preamble sequence.

The period of time may depend on a processing speed of the gNB, or may be pre-configured by the gNB for the UE or pre-determined in a protocol. Specifically, the UE sets the period of time based on a reference air interface format supported by a serving cell of the UE. In this embodiment of this application, the period of time may be an integer multiple of a transmission time interval (TTI) length. A TTI is used as a timing unit, and a value of a timing unit is configured by using a protocol, or a minimum TTI is used as a timing unit. For example, for a TTI length of 0.1 ms, the period of time may be 25*0.1 ms; and for a TTI length of 1 ms, the period of time may be 3*1 ms.

The reference air interface format may be a parameter set of a subcarrier spacing and a cyclic prefix length, and the reference air interface format may be named numerology. It may be understood that the reference air interface format may be but is not limited to being named numerology. This is not limited in this embodiment of this application. The subcarrier spacing in the reference air interface format may be any one of the following: a subcarrier spacing that is the same as a subcarrier spacing of a resource for transmitting an RAR message, a subcarrier spacing that is the same as a subcarrier spacing of a resource for transmitting a synchronization signal (for example, a primary synchronization signal, PSS) or a secondary synchronization signal, or a subcarrier spacing that is the same as a subcarrier spacing of a system information transmission resource (for example, a physical broadcast channel (PBCH)). The reference air interface format may be pre-determined in a protocol or pre-configured by the gNB.

Step S4034: The UE sends data to the gNB.

Optionally, the UE may send data to the gNB based on the uplink grant in the RAR message obtained in step 1022.

The data may be referred to as a msg3 (message 3). The data may include contention resolution information, and may further include information used to indicate a UE capability, where the UE capability may be a quantity of uplink frequency bands supported by the UE. The contention resolution information may occupy the first X bits of the msg3, and information used to indicate the UE capability may occupy another bit of the msg3. The contention resolution information may be any one of the following: a random value, a core network identifier S-TMSI of the terminal, or a cell identifier C-RNTI of the terminal.

Step 4035: The gNB receives the data and sends the contention resolution information to the UE.

The contention resolution information may be referred to as a msg4 (message 4). The contention resolution information may include contention resolution information and other information. The contention resolution information in the msg4 may occupy the first 48 bits of the msg4.

Step 4036: The UE receives the contention resolution information from the gNB, and compares the contention resolution information with contention resolution information included in the data. If the contention resolution information in the contention resolution information and the contention resolution information in the data are the same, it indicates that contention is resolved and random access succeeds. If the contention resolution information in the contention resolution information is different from the contention resolution information in the data, it indicates that contention is not resolved, random access fails, and the UE needs to initiate preamble sequence retransmission.

It should be noted that the random access process in FIG. 4a may not only be applied to the 5G system shown in FIG. 1, but also be compatible with an existing network system; for example, the random access process may be applied to an LTE system.

Optionally, in step 403 shown in FIG. 4, the UE may determine, based on a transmission scenario, to initiate random access based on one random access configuration or at least two random access configurations. For example, the UE may determine, based on a downlink path loss status of a downlink frequency band associated with the at least two uplink frequency bands, to initiate random access based on one random access configuration; or to accelerate random access, the UE initiates random access based on at least two random access configurations corresponding to the at least two uplink frequency bands.

The determining, by the UE based on a downlink path loss status of a downlink frequency band associated with the at least two uplink frequency bands, to initiate random access based on one random access configuration may include: obtaining, by the UE, a downlink path loss and a path loss threshold; and when the downlink path loss is greater than the path loss threshold, initiating, by the UE, random access based on a first random access configuration; or when the downlink path loss is less than or equal to the path loss threshold, initiating, by the UE, random access based on a second random access configuration.

The first random access configuration corresponds to a first uplink frequency band, the first uplink frequency band is any uplink frequency band in a first uplink frequency band group, the first uplink frequency band group includes at least one uplink frequency band, and a center frequency of each uplink frequency band in the first uplink frequency band group is less than a first preset threshold. The second random access configuration corresponds to a second uplink frequency band, the second uplink frequency band is any uplink frequency band in a second uplink frequency band group, the second uplink frequency band group includes at least one uplink frequency band, and a center frequency of each uplink frequency band in the second uplink frequency band group is greater than a second preset threshold. The second preset threshold is greater than the first preset threshold.

The downlink path loss may include at least one of the following: a cell path loss or a beam path loss. The UE may calculate the downlink path loss based on reference signal received power (RSRP). Specifically, for a calculation process of the UE, refer to the prior art. Details are not described herein. The path loss threshold may be obtained by using a broadcast message, or is preset and stored in the UE. A specific value of the path loss threshold is set depending on a requirement. This is not limited in this embodiment of this application.

When the downlink path loss is greater than the path loss threshold, it indicates that a downlink path loss is relatively high. To ensure reliability of signal transmission, uplink transmission needs to be performed on a relatively low frequency band (that is, an uplink frequency band with a relatively low path loss); or when the downlink path loss is less than or equal to the path loss threshold, it indicates that a current downlink path loss is relatively low, and using a relatively high frequency band does not affect signal transmission quality in uplink transmission.

The first preset threshold and the second preset threshold may be set depending on a requirement. This is not limited in this embodiment of this application. When a center frequency of an uplink frequency band is less than the first preset threshold, it indicates that the uplink frequency band is a low frequency band, and the first uplink frequency band group in which the uplink frequency band is located is a low frequency band group; or when a center frequency of the uplink frequency band is greater than the second preset threshold, it indicates that the uplink frequency band is a high frequency band, and the second uplink frequency band group in which the uplink frequency band is located is a high frequency band group.

Figure 5:
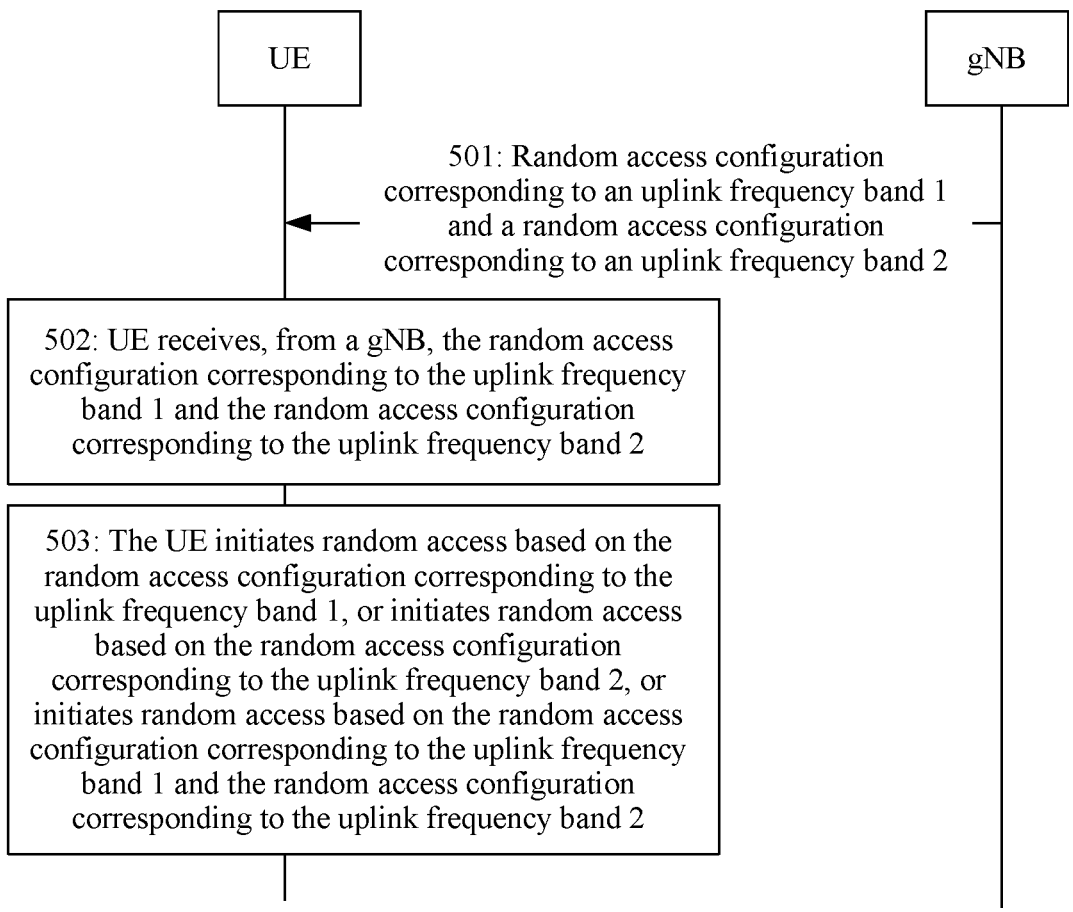
FIG. 5 is a flowchart of another random access method according to an embodiment of this application.
Figure 6:
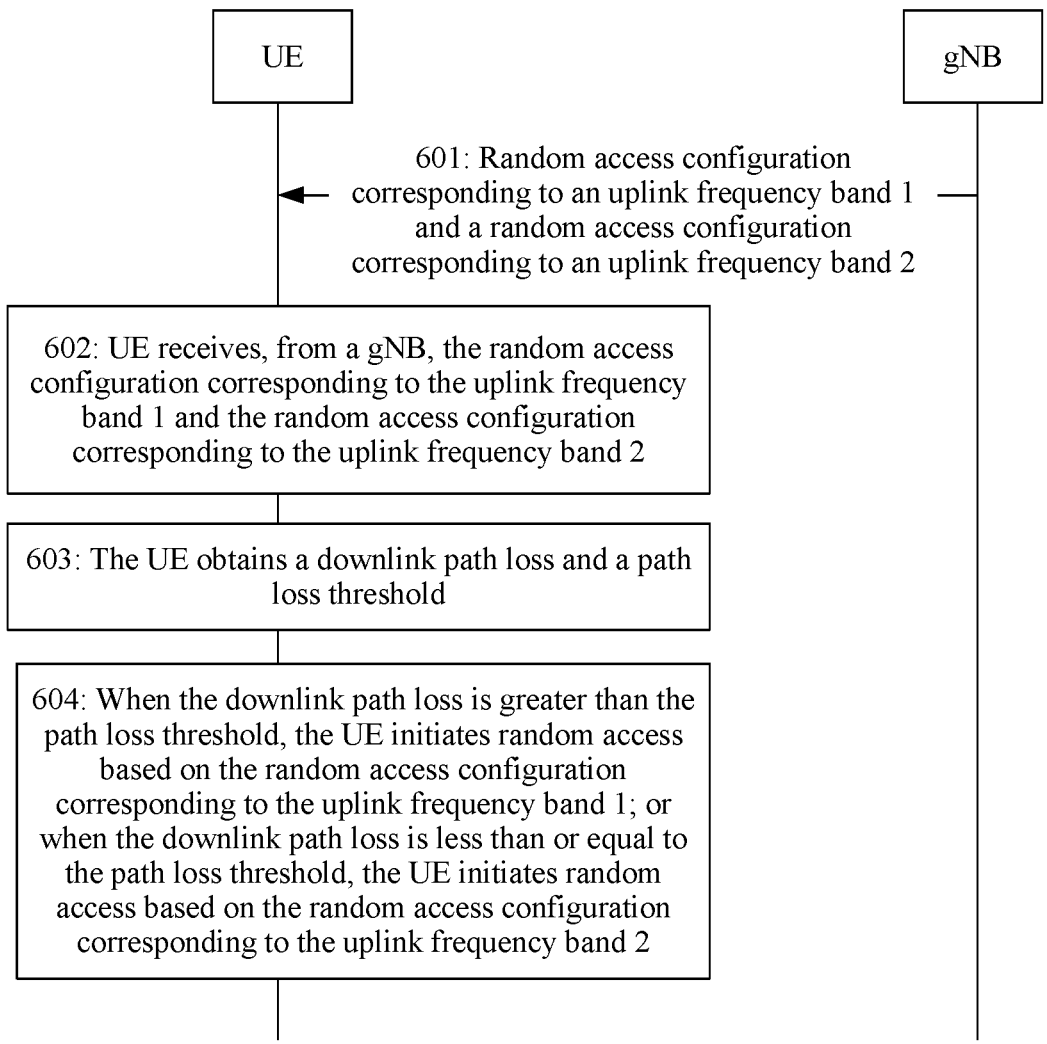
FIG. 6 is a flowchart of another random access method according to an embodiment of this application.
Figure 7:
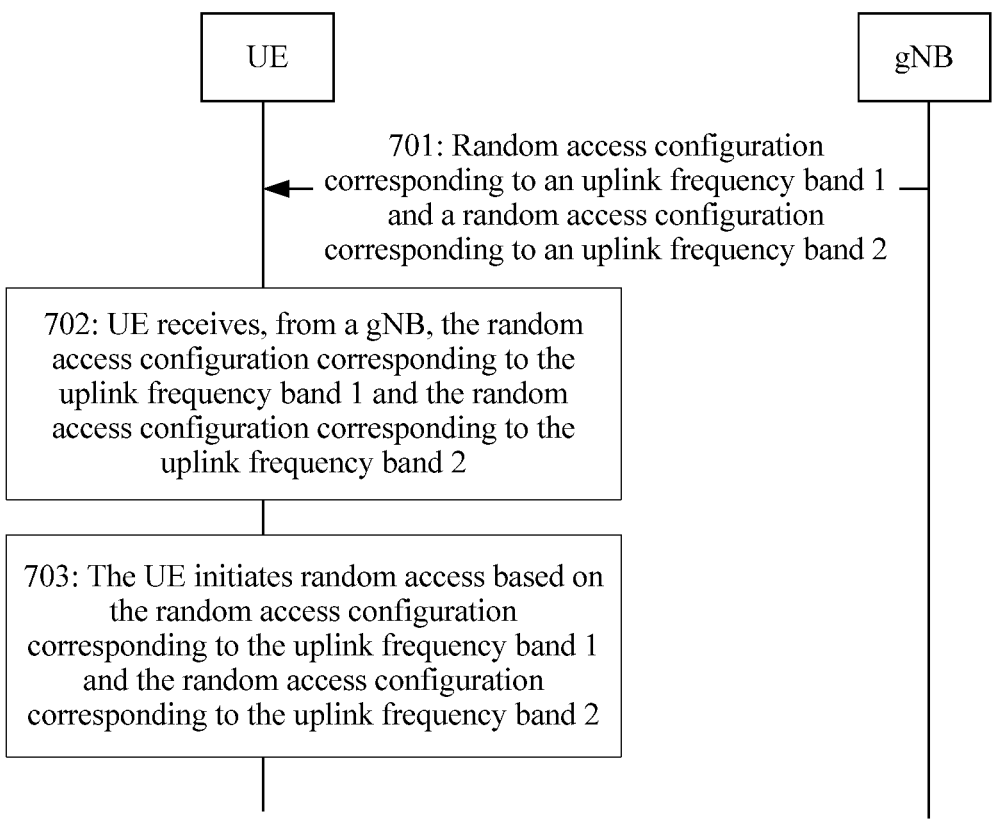
FIG. 7 is a flowchart of still another random access method according to an embodiment of this application.

With reference to FIGS. 5, 6, and 7, the following further describes in detail the random access method shown in FIG. 4 by using an example in which the gNB and the UE support an uplink frequency band 1 and an uplink frequency band 2. The uplink frequency band 1 and the uplink frequency band 2 belong to a same cell, and a center frequency of the uplink frequency band 1 is lower than a center frequency of the uplink frequency band 2. To be specific, the uplink frequency band 1 is a low frequency band, and the uplink frequency band 2 is a high frequency band.

FIG. 5 is a flowchart of another random access method according to an embodiment of this application. The method is performed by the UE shown in FIG. 3 and the gNB shown in FIG. 2 through interaction. As shown in FIG. 5, the method may include the following steps.

Step 501: The gNB configures, for the UE, a random access configuration corresponding to the uplink frequency band 1 and a random access configuration corresponding to the uplink frequency band 2.

Step 501 is the same as step 401. Details are not described herein again.

Step 502: The UE receives, from the gNB, the random access configuration corresponding to the uplink frequency band 1 and the random access configuration corresponding to the uplink frequency band 2.

Step 502 is the same as step 402. Details are not described herein again.

Step 503: The UE initiates random access based on the random access configuration corresponding to the uplink frequency band 1, or initiates random access based on the random access configuration corresponding to the uplink frequency band 2, or initiates random access based on the random access configuration corresponding to the uplink frequency band 1 and the random access configuration corresponding to the uplink frequency band 2.

In step 503, for a process in which the UE initiates random access, refer to existing contention-based 4-step random access, existing non-contention-based 3-step random access, or a process shown in FIG. 4a. Details are not described herein again.

Specifically, in step 503, based on an actual transmission scenario, the UE may initiate random access based on one random access configuration by using a solution shown in FIG. 6, or initiate random access based on two random access configurations in a manner shown in FIG. 7.

FIG. 6 is a flowchart of another random access method according to an embodiment of this application. The method is performed by the UE shown in FIG. 3 and the gNB shown in FIG. 2 through interaction. The method may be used by the UE to determine, based on a downlink path loss, to initiate random access based on a random access configuration. As shown in FIG. 6, the method may include the following steps.

Step 601: The gNB configures, for the UE, a random access configuration corresponding to the uplink frequency band 1 and a random access configuration corresponding to the uplink frequency band 2.

Step 601 is the same as step 401. Details are not described herein again.

Step 602: The UE receives, from the gNB, the random access configuration corresponding to the uplink frequency band 1 and the random access configuration corresponding to the uplink frequency band 2.

Step 602 is the same as step 402. Details are not described herein again.

Step 603: The UE obtains a downlink path loss and a path loss threshold.

For a process in which the UE obtains the downlink path loss and the path loss threshold, refer to a process in the foregoing method embodiments. Details are not described herein again.

Step 604: When the downlink path loss is greater than the path loss threshold, the UE initiates random access abased on the random access configuration corresponding to the uplink frequency band 1. When the downlink path loss is less than or equal to the path loss threshold, the UE initiates random access based on the random access configuration corresponding to the uplink frequency band 2.

In step 604, for a process in which the UE initiates random access, refer to existing contention-based 4-step random access, existing non-contention-based 3-step random access, or the process shown in FIG. 4a. Details are not described herein again.

In this way, the UE can determine, based on a downlink path loss status, to initiate random access based on one of the two random access configurations corresponding to the two uplink frequency bands, to improve uplink access quality of the UE.

FIG. 7 is a flowchart of another random access method according to an embodiment of this application. The method is performed by the UE shown in FIG. 3 and the gNB shown in FIG. 2 through interaction. The method may be used by the UE to initiate random access based on two random access configurations. As shown in FIG. 7, the method may include the following steps.

Step 701: The gNB configures, for the UE, a random access configuration corresponding to the uplink frequency band 1 and a random access configuration corresponding to the uplink frequency band 2.

Step 701 is the same as step 401. Details are not described herein again.

Step 702: The UE receives, from the gNB, the random access configuration corresponding to the uplink frequency band 1 and the random access configuration corresponding to the uplink frequency band 2.

Step 702 is the same as step 402. Details are not described herein again.

Step 703: The UE initiates random access based on the random access configuration corresponding to the uplink frequency band 1 and the random access configuration corresponding to the uplink frequency band 2.

In step 703, for a process in which the UE initiates random access, refer to existing contention-based 4-step random access, existing non-contention-based 3-step random access, or the process shown in FIG. 4a. Details are not described herein again.

In this way, when there are two uplinks between the UE and the gNB, the UE may simultaneously perform random access on the two uplink frequency bands to accelerate random access.

Further, in the embodiments of the present invention, after step 403, step 503, step 604, or step 703, if the UE fails to initiate random access based on a random access configuration of any uplink frequency band, to facilitate network planning and optimization on a gNB side, the method may further include: recording, by the UE, a quantity of random access failures and message sending and receiving statuses in a process in which the random access fails, and reporting, to the gNB, the quantity of random access failures and the message sending and receiving statuses in the process in which the random access fails.

A random access failure means: In a continuous period of time, a quantity of times that the UE initiates random access based on a same random access configuration is greater than or equal to a preset quantity of times, or duration in which the UE initiates random access based on a random access configuration is greater than or equal to preset duration, in other words, the random access times out. In this embodiment of this application, the preset quantity of times and the preset duration may be set depending on a requirement. This is not limited in this embodiment of this application. Optionally, the UE may report the quantity of random access failures and the message sending and receiving statuses in the process in which the random access fails, in minimization of drive tests (MDT).

Further, in this embodiment of the present invention, after the UE fails to initiate random access based on a random access configuration corresponding to a high frequency band, the UE may further initiate random access based on a random access configuration corresponding to a low frequency band, to improve random access quality. The process may be performed together with the foregoing process in which the UE reports, to the gNB, the quantity of random access failures and the message sending and receiving statuses in the process in which the random access fails, or may be separately performed. This is not limited in this embodiment of the present invention.

For example, in the solution shown in FIG. 6, when the UE fails to initiate random access based on the random access configuration corresponding to the uplink frequency band 2, the UE may initiate random access based on the random access configuration corresponding to the uplink frequency band 1.

Alternatively, in a solution shown in FIG. 4, after failing to initiate random access based on the second random access configuration, the UE may initiate random access based on a third random access configuration, where the third random access configuration corresponds to a third uplink frequency band, and the third uplink frequency band is any uplink frequency band in the first uplink frequency band group.

Further, in the embodiments of the present invention, after step 403, step 503, step 604, or step 703, if the UE successfully initiates random access, the UE may perform uplink transmission based on any one of the at least two uplink frequency bands, and in an uplink transmission process, perform transmission based on some indications or commands delivered by the gNB, to increase uplink transmission efficiency. Specifically, after step 403, step 503, step 604, or step 703, if the UE successfully initiates random access, the method may further include one or more steps in a technical solution shown in FIG. 8A and FIG. 8B. That is, a technical solution obtained by combining a technical solution shown in FIG. 4, FIG. 5, FIG. 6, or FIG. 7 and one or more steps in the technical solution shown in FIG. 8A and FIG. 8B also falls within the protection scope of the embodiments of the present invention.

Figure 8A:
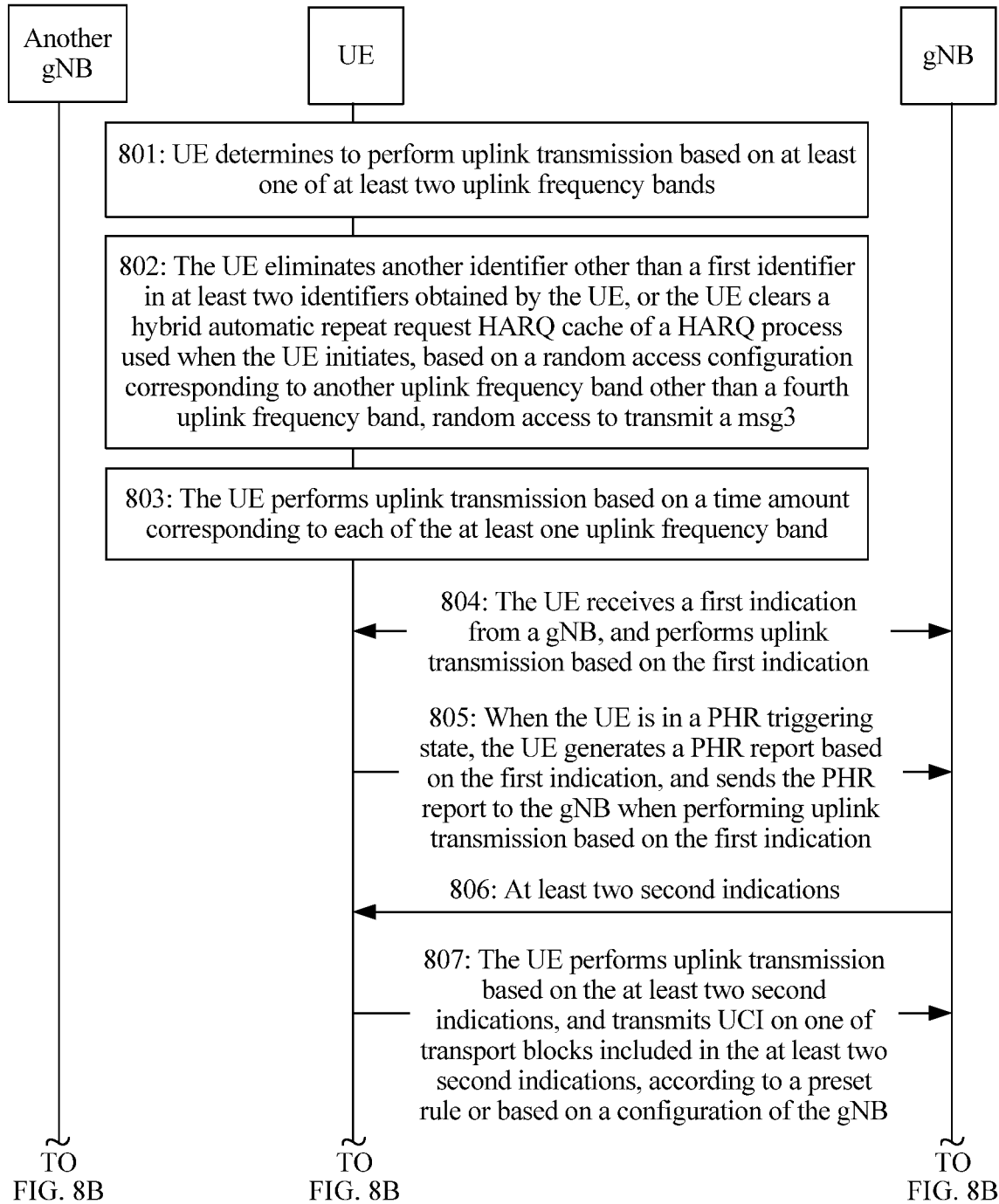
FIG. 8A and FIG. 8B are a flowchart of still another random access method according to an embodiment of this application.
Figure 8B:
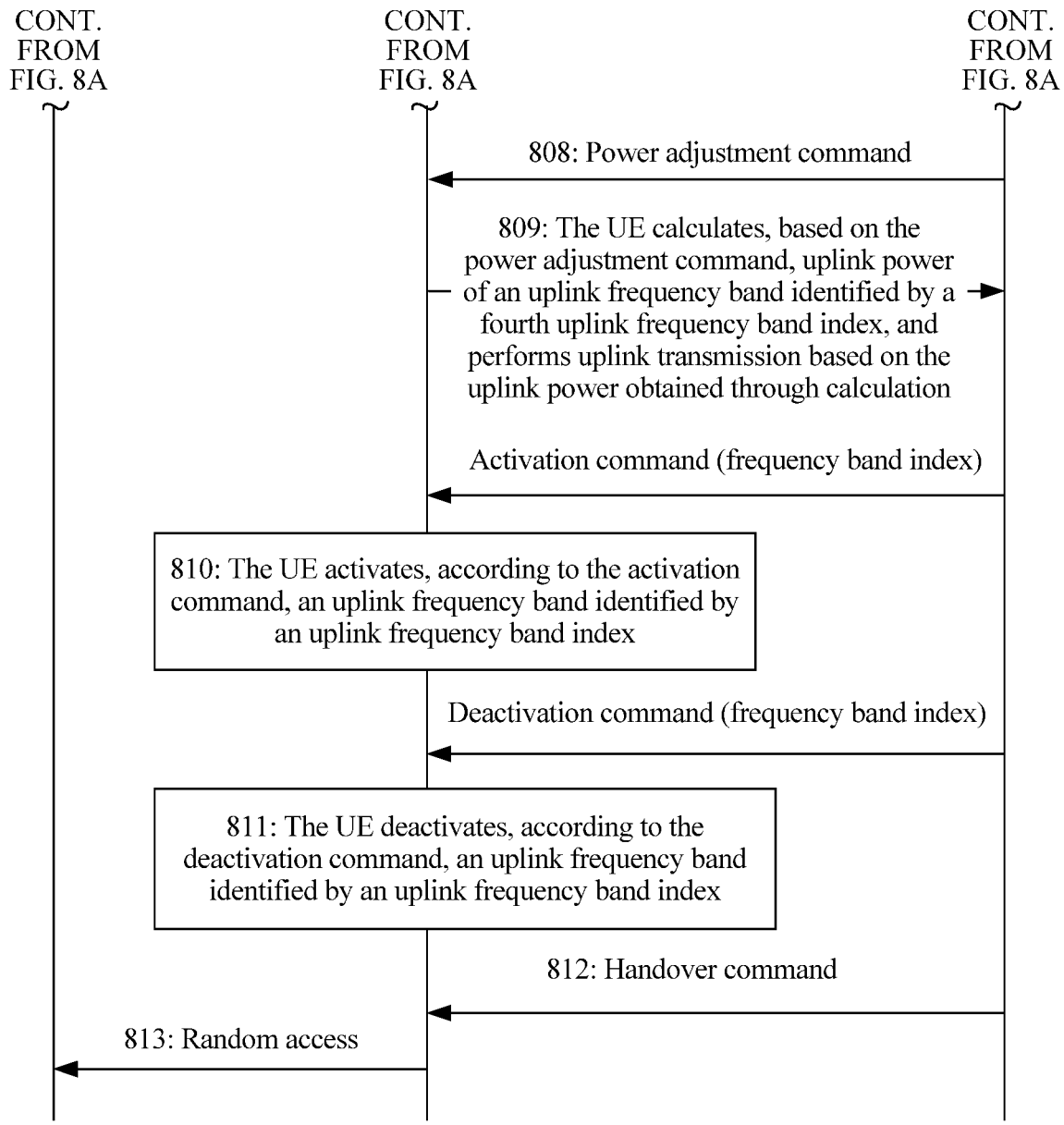

FIG. 8A and FIG. 8B are a flowchart of still another random access method according to an embodiment of this application. The random access method is performed by the UE shown in FIG. 3 and the gNB shown in FIG. 2 through interaction. The method may include the following step:

Step 801: The UE determines to perform uplink transmission based on at least one of at least two uplink frequency bands.

For example, after initiating random access based on random access configurations of an uplink frequency band 1, an uplink frequency band 2, and an uplink frequency band 3, the UE may perform uplink transmission based on any one of the uplink frequency band 1, the uplink frequency band 2, and the uplink frequency band 3, or perform uplink transmission based on any two of the uplink frequency band 1, the uplink frequency band 2, and the uplink frequency band 3, or perform uplink transmission based on all of the three uplink frequency bands: the uplink frequency band 1, the uplink frequency band 2, and the uplink frequency band 3.

Optionally, for any one of the at least one uplink frequency band, the UE may determine to perform uplink transmission based on the uplink frequency band. For example, in the solution shown in FIG. 6, the UE initiates random access based only on the random access configuration of the uplink frequency band 1 or the random access configuration of the uplink frequency band 2. Naturally, after the random access succeeds, the UE may determine to perform uplink transmission based on the uplink frequency band used for initiating the random access.

Alternatively, the UE may determine, based on scrambled information obtained from the gNB, a first identifier from at least two identifiers, and determine an uplink frequency band corresponding to the first identifier, to perform uplink transmission.

The scrambled information is scrambled by using any one of the at least two identifiers, and the UE may obtain a scrambled message from a cyclic redundancy code check of downlink control information that is used to indicate a time-frequency resource location of a msg4. The at least two identifiers are different. Each of the at least two identifiers is an identifier obtained by the UE from the gNB when the UE initiates random access based on a random access configuration of the uplink frequency band corresponding to the identifier. For example, the UE may obtain the at least two identifiers from the msg2 in the random access process shown in FIG. 4a.

For example, after successfully initiating random access based on the random access configurations of the uplink frequency band 1, the uplink frequency band 2, and the uplink frequency band 3, the UE obtains an identifier 1 corresponding to the uplink frequency band 1, an identifier 2 corresponding to the uplink frequency band 2, and an identifier 3 corresponding to the uplink frequency band 3. After receiving the scrambled information, the UE descrambles the scrambled information by using the identifier 1, the identifier 2, and the identifier 3. Because the scrambled information is scrambled by using one of the three identifiers, only one identifier can successfully descramble the scrambled information. When the identifier 1 successfully descrambles the scrambled information, the UE may perform uplink transmission on the uplink frequency band 1.

Further, to reduce storage load of the UE, after the UE determines to perform uplink transmission based on the at least one uplink frequency band, as shown in FIG. 8A and FIG. 8B, the method may further include the following step:

Step 802: The UE eliminates an identifier other than the first identifier in the at least two identifiers obtained by the UE, or the UE clears a HARQ buffer of a HARQ process used when the UE initiates, based on a random access configuration corresponding to another uplink frequency band other than a fourth uplink frequency band, random access to transmit a msg3.

The first identifier is an identifier corresponding to an uplink frequency band used by the UE for uplink transmission; and the fourth uplink frequency band is an uplink frequency band used by the UE for uplink transmission.

For example, the UE initiates random access based on the random access configurations of the uplink frequency band 1, the uplink frequency band 2, and the uplink frequency band 3, and after the random access, the UE determines to perform uplink transmission on the uplink frequency band 1. In this case, the UE may eliminate the identifier 2 corresponding to the uplink frequency band 2 and the identifier 3 corresponding to the uplink frequency band 3. Alternatively, a hybrid automatic repeat request buffer used when the UE initiates random access based on the random access configuration corresponding to the uplink frequency band 2 and a hybrid automatic repeat request buffer used when the UE initiates random access based on the random access configuration corresponding to the uplink frequency band 3 are cleared.

Further, to implement uplink synchronization between uplink frequency bands in an uplink transmission process, as shown in FIG. 8A and FIG. 8B, the method may further include the following step:

Step 803: The UE performs uplink transmission based on a time amount corresponding to each of the at least one uplink frequency band.

The time amount may be TA, and may be configured by the gNB for the UE. A TA corresponding to each uplink frequency band is calculated based on a downlink subframe boundary. For example, the TA may be calculated by using a formula: $TA\_SUL = 2*T\_offset - TA\_PUL$, where TA_SUL is an uplink timing advance of any uplink frequency band, T_offset is a difference between a moment at which the gNB sends a downlink subframe and a moment at which the gNB receives an uplink subframe, and TA_PUL is an uplink timing advance of any uplink frequency band other than the uplink frequency band corresponding to TA_SUL. It should be noted that a reception point of any uplink frequency band other than the uplink frequency band corresponding to TA_SUL of the gNB is co-located with a transmission point of a downlink frequency band (for example, at a same location or nearby). Specifically, the UE may manage and maintain a time amount of each uplink frequency band in the following manner.

In this embodiment of the present invention, the UE manages and maintains a time amount of each uplink frequency band in the following manner: the UE receives, from the gNB, two time groups of at least one cell, and stores at least one time group of at least one cell, where the at least one time group is in a one-to-one correspondence with the at least one uplink frequency band, each time group corresponds to one time amount, one timer, and at least one uplink frequency band, the at least one uplink frequency band belongs to at least one cell, the at least one cell is a cell managed by the gNB, the time amount is used by the UE to perform uplink synchronization, and the timer is used to limit effective time of the time amount; and for any one of the at least one cell, the UE stops uplink transmission on an uplink frequency band corresponding to the time group when a timer corresponding to any time group of the cell expires, where the uplink transmission may be uplink transmission based on a physical uplink shared channel or a physical uplink control channel, or uplink transmission of an SRS sounding reference signal; and the uplink transmission does not include uplink transmission of a physical random access channel; and a specific representation is: whether a PUCCH/SRS/uplink semi-persistent scheduling SPS resource corresponding to the uplink transmission is released; or for any one of the at least one cell, the UE clears a hybrid automatic repeat request buffer corresponding to the cell when timers corresponding to all time groups of the cell expire; or when timers corresponding to all time groups of a primary cell in the at least one cell expire, the UE clears a hybrid automatic repeat request buffer corresponding to another cell, in the at least one cell, other than the primary cell, and determines that timers corresponding to all time groups of the another cell expire; and after receiving a time amount adjustment command from the gNB, the UE starts or restarts, based on the time amount adjustment command, a timer corresponding to a first time group of a first cell, where the time amount adjustment command is used to instruct the UE to adjust the timer corresponding to the first time group of the first cell.

It should be noted that the time amount adjustment command may be transmitted by using a media access control element (MAC CE) or a random access response message.

The timer may be a timing advance timer (TAT). Duration of the timer may be configured by the gNB for the UE depending on a requirement. This is not limited in this embodiment of this application.

Further, to assist the gNB in resource scheduling, the UE may further perform uplink transmission based on an indication of the gNB by using a resource corresponding to an uplink frequency band, and report a PHR. As shown in FIG. 8A and FIG. 8B, the method may further include the following step:

Step 804: The UE receives a first indication from the gNB, and performs uplink transmission based on the first indication.

The first indication includes a first uplink frequency band index and a transmission resource corresponding to an uplink frequency band identified by the first uplink frequency band index, and the uplink frequency band identified by the first uplink frequency band index may be any uplink frequency band that is in the at least two uplink frequency bands and that is used for uplink transmission.

Step 805: When the UE is in a PHR triggering state, the UE generates a PHR based on the first indication, and sends the PHR to the gNB when performing uplink transmission based on the first indication.

The PHR includes an uplink frequency band index and a power headroom of an uplink frequency band identified by the uplink frequency band index.

It should be noted that step 805 is an optional step. To be specific, when step 804 is performed, step 805 may be performed to send the PHR to the gNB, or step 805 may not be performed.

Further, when a plurality of uplink frequency bands are simultaneously used for uplink transmission, the UE may further perform uplink transmission based on another indication of the gNB by using a transport block corresponding to an uplink frequency band, and determine which transport block is used to transmit uplink control information. As shown in FIG. 8A and FIG. 8B, the method may further include the following steps.

Step 806: The UE receives at least two second indications from the gNB.

Each of the at least two second indications may include a second uplink frequency band index and a transport block corresponding to an uplink frequency band identified by the second uplink frequency band index.

Step 807: The UE performs uplink transmission based on the at least two second indications, and transmits UCI on one of transport blocks included in the at least two second indications, according to a preset rule or based on a configuration of the gNB.

Further, to improve transmission quality of an uplink signal of the UE, the UE may further perform uplink power control based on a power adjustment command of the gNB. As shown in FIG. 8A and FIG. 8B, the uplink power control may further include the following step:

Step 808: The UE receives the power adjustment command from the gNB.

The power adjustment command includes a fourth uplink frequency band index and a power control parameter, and the power adjustment command is used to request the gNB to adjust power of uplink transmission performed on an uplink frequency band identified by an uplink frequency band index.

Step 809: The UE calculates, based on the power adjustment command, uplink power of an uplink frequency band identified by the fourth uplink frequency band index, and performs uplink transmission based on the uplink power obtained through calculation.

Further, to improve resource utilization of an uplink frequency band, the UE may further activate any uplink frequency band according to an activation command of the gNB, or may deactivate any uplink frequency band according to a deactivation command of the gNB. As shown in FIG. 8A and FIG. 8B, the method may further include the following steps.

Step 810: The UE receives, from the gNB, the activation command that includes an uplink frequency band index, and the UE activates, according to the activation command, an uplink frequency band identified by the uplink frequency band index.

Step 811: The UE receives, from the gNB, the deactivation command that includes an uplink frequency band index, and the UE activates, according to the deactivation command, an uplink frequency band identified by the uplink frequency band index.

It should be noted that step 810o and step 811 may be successively performed in a sequence shown in FIG. 8A and FIG. 8B (it should be noted that when step 810o and step 811 are successively performed, the activated and deactivated uplink frequency bands may not be a same uplink frequency band); alternatively, one of step 810o and step 811 may be performed. A specific performing manner depends on a command received by the UE from the gNB. This is not limited in this embodiment of the present invention.

Further, to improve uplink transmission quality of the UE, after moving to a coverage area of another gNB, the UE may further receive a handover command delivered by the gNB, to access another gNB. As shown in FIG. 8A and FIG. 8B, the UE may further include the following steps.

Step 812: The UE receives a handover command from the gNB, where the handover command is used to instruct the UE to access an uplink frequency band of another gNB and a random access resource corresponding to the uplink frequency band.

Step 813: The UE initiates random access to the another gNB according to the handover command.

The handover command may be a radio resource management RRC connection reconfiguration message. For steps of random access, refer to existing contention-based 4-step random access, existing non-contention-based 3-step random access, or the random access shown in FIG. 4a.

In this way, after random access, when performing uplink transmission based on the at least one uplink frequency band, the UE may perform uplink transmission based on some indications or commands delivered by the gNB, to increase uplink transmission efficiency.

In addition, in the technical solution provided in the embodiments of the present invention, same steps between the foregoing method embodiments may be mutually referenced.

The foregoing describes the solutions provided in the embodiments of this application, mainly from a perspective of interaction between the UE and the gNB. It may be understood that, to implement the foregoing functions, each network element, for example, the UE or the gNB, includes corresponding hardware structures and/or software modules for performing the functions. A person skilled in the art should be easily aware that the algorithm steps in the examples described with reference to the embodiments disclosed in this specification can be implemented in a form of hardware or a combination of hardware and computer software in this application. Whether a function is implemented by hardware or in a manner of driving hardware by computer software depends on particular applications and design constraints of the technical solutions. A person skilled in the art may use different methods to implement the described functions for each particular application, but it should not be considered that the implementation goes beyond the scope of this application.

In the embodiments of this application, the UE may be divided into function modules based on the foregoing method examples. For example, each function module may be obtained through division based on each corresponding function, or two or more functions may be integrated into one processing module. The integrated module may be implemented in a form of hardware, or may be implemented in a form of a function module of software. It should be noted that module division in the embodiments of this application is an example and is merely logical function division. During actual implementation, there may be another division manner.

Figure 9:
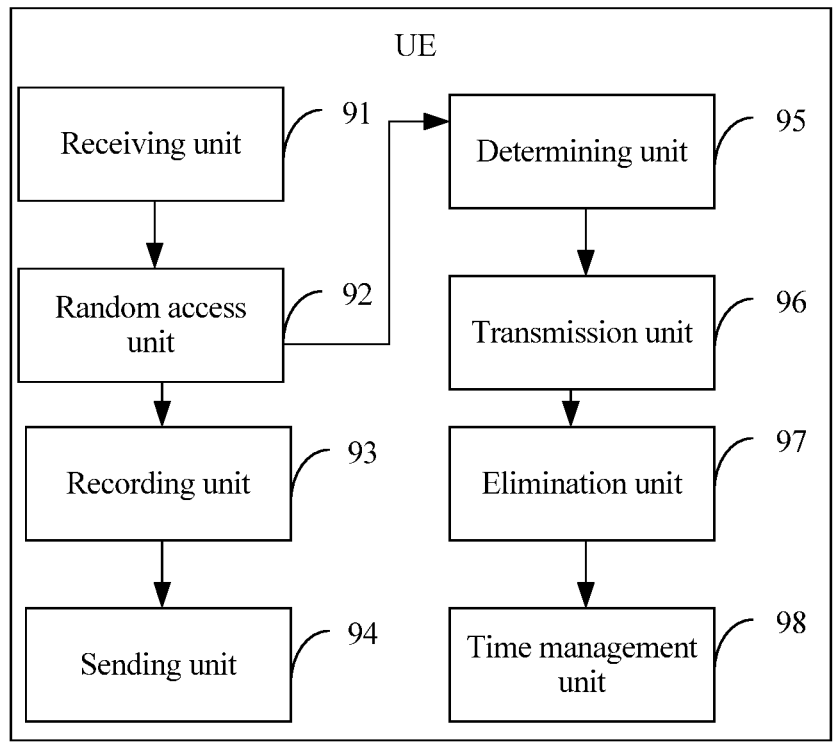
FIG. 9 is a schematic structural diagram of UE according to an embodiment of this application.

When each function module is obtained through division based on each corresponding function, FIG. 9 is a possible schematic structural diagram of the UE in the foregoing embodiments. As shown in FIG. 9, the UE may include a receiving unit 91, a random access unit 92, a recording unit 93, a sending unit 94, a determining unit 95, a transmission unit 96, an elimination unit 97, and a time management unit 98.

The receiving unit 91 is adapted to support the UE in performing step 402, step 4032, step 4033, step 4035, step 502, step 602, step 702, step 804, step 806, step 808, and step 812 in the foregoing method embodiments.

The random access unit 92 is adapted to support the UE in performing step 403, step 503, step 604, step 703, and step 813 in the foregoing method embodiments.

The sending unit 94 is adapted to support the UE in performing step 4031, step 4034, and step 805 in the foregoing method embodiments.

The determining unit 95 is adapted to support the UE in performing step 4036 and step 801 in the foregoing method embodiments.

The transmission unit 96 is adapted to support the UE in performing step 803, step 804, step 807, and step 809 in the foregoing method embodiments.

The elimination unit 97 is adapted to support the UE in performing step 802 in the foregoing method embodiments.

The time management unit 98 is adapted to support the UE in performing a TA management and maintenance function in the foregoing method embodiments.

The recording unit 93 is adapted to support the UE in performing a function of recording a random access failure event in the foregoing method embodiments.

It should be noted that all related content of the steps in the method embodiments can be incorporated into the descriptions of functions of the corresponding function modules by reference. Details are not described herein again. The UE provided by this embodiment of the present invention is adapted to perform the foregoing random access method, and therefore can achieve a same effect as the foregoing random access method.

Figure 10:
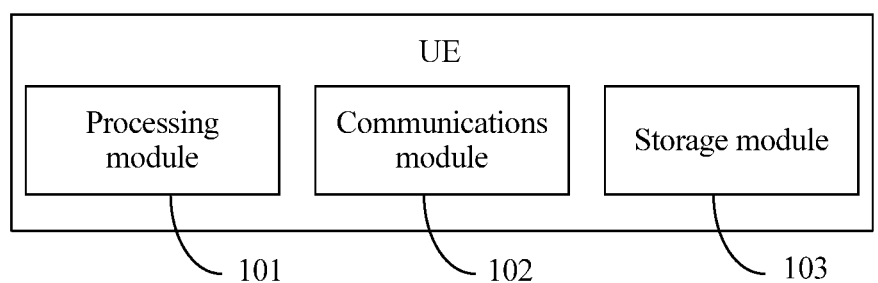
FIG. 10 is a schematic structural diagram of UE according to an embodiment of this application.

When an integrated unit is used, FIG. 10 is another possible schematic structural diagram of the UE in the foregoing embodiments. As shown in FIG. 10, the UE may include a processing module 101 and a communications module 102.

The processing module 101 is adapted to control and manage an action of the UE. The communications module 102 is adapted to support the UE in communicating with another network entity, for example, communicating with a function module or a network entity shown in FIG. 1. The UE may further include a storage module 103, adapted to store program code and data of a server.

The processing module 101 may be a processor or a controller. The processing module 101 can implement or execute various example logical blocks, modules, and circuits that are described with reference to the content disclosed in the present invention. The processor may be alternatively a combination that implements a computing function, for example, a combination including one or more microprocessors, or a combination of a DSP and a microprocessor. The communications module 102 may be a transceiver, a transceiver circuit, a communications interface, or the like. The storage module 103 may be a memory.

When the processing module 101 is a processor, the communications module 102 is a communications interface. When the storage module 103 is a memory, the server in this embodiment of the present invention may be the UE shown in FIG. 3.

Figure 11:
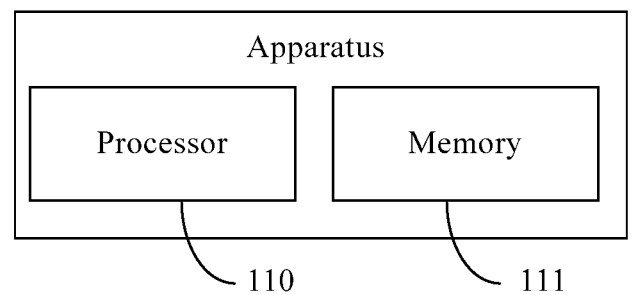
FIG. 11 is a schematic structural diagram of an apparatus according to an embodiment of this application.

When an integrated unit is used, an embodiment of the present invention further provides an apparatus. The apparatus may exist in a product form of a chip. As shown in FIG. 11, the apparatus may include a processor 110 and a memory 111.

The memory 111 is coupled to the processor 110, and stores a program instruction and data that are necessary for the apparatus. The processor 110 is adapted to execute the program instruction stored in the memory 111, so that the apparatus performs a function corresponding to an operation performed by the UE in the foregoing method.

Figure 12:
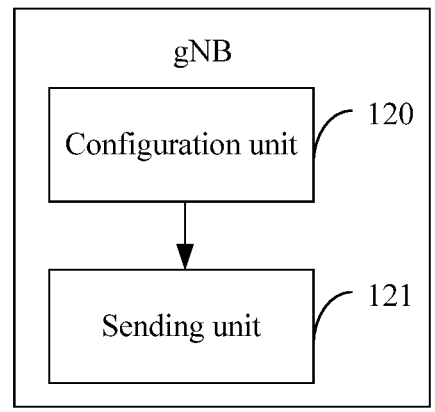
FIG. 12 is a schematic structural diagram of a gNB according to an embodiment of this application.

When each function module is obtained through division based on each corresponding function, FIG. 12 is a possible schematic structural diagram of the gNB in the foregoing embodiments. As shown in FIG. 12, the gNB may include a configuration unit 120 and a sending unit 121.

The configuration unit 121 is adapted to support the gNB in performing step 401 in FIG. 4, step 501 in FIG. 5, step 601 in FIG. 6, and step 701 in FIG. 7.

The sending unit 121 is adapted to support the gNB in performing steps of sending a message, data, or a command to the UE in FIG. 4a and FIG. 8A and FIG. 8B.

It should be noted that all related content of the steps in the method embodiments can be incorporated into the descriptions of functions of the corresponding function modules by reference. Details are not described herein again. The gNB provided by this embodiment of the present invention is adapted to perform the foregoing random access method, and therefore can achieve a same effect as the foregoing random access method.

Figure 13:
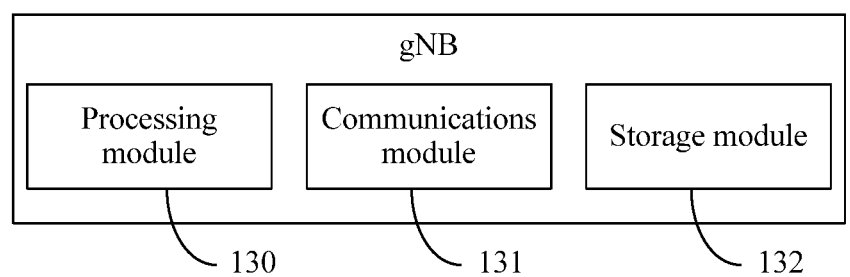
FIG. 13 is a schematic structural diagram of a gNB according to an embodiment of this application.

When an integrated unit is used, FIG. 13 is another possible schematic structural diagram of the gNB in the foregoing embodiments. As shown in FIG. 13, the gNB may include a processing module 130 and a communications module 131.

The processing module 130 is adapted to control and manage an action of the gNB. The communications module 131 is adapted to support the gNB in communicating with another network entity, for example, communicating with a function module or a network entity shown in FIG. 1. The gNB may further include a storage module 132, adapted to store program code and data of a server.

The processing module 130 may be a processor or a controller. The processing module 130 can implement or execute various example logical blocks, modules, and circuits that are described with reference to the content disclosed in the present invention. The processor may be alternatively a combination that implements a computing function, for example, a combination including one or more microprocessors, or a combination of a DSP and a microprocessor. The communications module 131 may be a transceiver, a transceiver circuit, a communications interface, or the like. The storage module 132 may be a memory.

When the processing module 130 is a processor, the communications module 131 is a communications interface. When the storage module 132 is a memory, the server in this embodiment of the present invention may be the gNB shown in FIG. 2.

Figure 14:
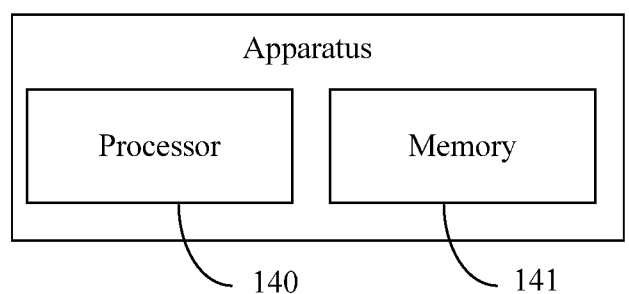
FIG. 14 is a schematic structural diagram of an apparatus according to an embodiment of this application.

When an integrated unit is used, an embodiment of the present invention further provides an apparatus. The apparatus may exist in a product form of a chip. As shown in FIG. 14, the apparatus may include a processor 140 and a memory 141.

The memory 141 is coupled to the processor 140, and stores a program instruction and data that are necessary for the apparatus. The processor 140 is adapted to execute the program instruction stored in the memory 141, so that the apparatus performs a function corresponding to an operation performed by the gNB in the foregoing method.

From the foregoing descriptions about the implementations, a person skilled in the art can clearly understand that, for the purpose of ease and brevity of description, division of the foregoing function modules is used as an example for illustration. In actual application, the foregoing functions can be allocated to and implemented by different modules depending on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may be one or more physical units, in other words, may be located in one place, or may be distributed on a plurality of different places. Some or all of the units may be selected depending on actual requirements, to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes one or more instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
receiving, by a terminal from an access network device, random access configurations corresponding to at least two uplink frequency bands,
wherein a center frequency of one of the at least two uplink frequency bands is different from center frequencies of all of remaining ones of the at least two uplink frequency bands,
wherein the random access configurations include a first random access configuration corresponding to a first uplink frequency band of the at least two uplink frequency bands and a second random access configuration corresponding to a second uplink frequency band of the at least two uplink frequency bands,
wherein the first random access configuration includes a first root sequence for generating a first preamble sequence, a first power ramp step for power control of the first preamble sequence, and a first maximum quantity of first preamble sequence transmissions, and
wherein the second random access configuration includes a second root sequence for generating a second preamble sequence, a second power ramp step for power control of the second preamble sequence, and a second maximum quantity of second preamble sequence transmissions; and
after the receiving the random access configurations, initiating, by the terminal, random access based on at least one of the random access configurations corresponding to the at least two uplink frequency bands,
the initiating the random access including:
determining, by the terminal based on a downlink path loss status, to initiate the random access based on one of the random access configurations corresponding to the at least two uplink frequency bands,
the determining to initiate the random access including:
obtaining, by the terminal, a downlink path loss; and
when the downlink path loss is greater than a path loss threshold, initiating, by the terminal, the random access based on the first random access configuration, wherein the first random access configuration corresponds to the first uplink frequency band, the first uplink frequency band is any uplink frequency band in a first uplink frequency band group, the first uplink frequency band group comprises at least the first uplink frequency band, and a center frequency of each uplink frequency band in the first uplink frequency band group is less than a first preset threshold,
the random access including:
transmitting, by the terminal to the access network device, a preamble sequence corresponding to one of the at least two uplink frequency bands, wherein the preamble sequence indicates a capability of the terminal regarding a quantity of uplink frequency bands that can be supported by the terminal.

2. The method according to claim 1, wherein the method further comprises:
when the downlink path loss is less than or equal to the path loss threshold, initiating, by the terminal, the random access based on the second random access configuration, wherein the second random access configuration corresponds to the second uplink frequency band, the second uplink frequency band is any uplink frequency band in a second uplink frequency band group, the second uplink frequency band group comprises at least the second uplink frequency band, a center frequency of each uplink frequency band in the second uplink frequency band group is greater than a second preset threshold, and the second preset threshold is greater than the first preset threshold.

3. The method according to claim 2, wherein after the terminal fails to initiate the random access, the method further comprises:
initiating, by the terminal, another random access based on a third random access configuration, wherein
the third random access configuration corresponds to a third uplink frequency band, and the third uplink frequency band is any uplink frequency band in the first uplink frequency band group.

4. The method according to claim 1, wherein the terminal stores at least one time group of at least one cell, each of the at least one time group corresponds to one time amount, one timer, and at least one uplink frequency band, the at least one cell is a cell managed by the access network device, the time amount is used by the terminal to perform uplink synchronization, and the timer is used to limit effective time of the time amount; and the method further comprises:
for any one of the at least one cell, stopping, by the terminal when a timer corresponding to any time group of the cell expires, performing uplink transmission on an uplink frequency band corresponding to the time group; or
for any one of the at least one cell, clearing, by the terminal when timers corresponding to all time groups of the cell expire, a hybrid automatic repeat request buffer corresponding to the cell.

5. The method according to claim 4, wherein the method further comprises:
when timers corresponding to all time groups of a primary cell in the at least one cell expire, clearing, by the terminal, a hybrid automatic repeat request buffer corresponding to another cell, in the at least one cell, other than the primary cell, and determining that timers corresponding to all time groups of the another cell expire; and
receiving, by the terminal, a time amount adjustment command from the access network device, and starting, based on the time amount adjustment command, a timer corresponding to a first time group of a first cell, wherein the time amount adjustment command is used to instruct the terminal to adjust the timer corresponding to the first time group of the first cell.

6. The method according to claim 1, wherein the method further comprises:
receiving, by the terminal, a first indication from the access network device, wherein the first indication comprises a first uplink frequency band index and a transmission resource corresponding to an uplink frequency band identified by the first uplink frequency band index; and
performing, by the terminal, uplink transmission based on the first indication.

7. The method according to claim 6, wherein the method further comprises:
generating, by the terminal when the terminal is in a power headroom report PHR triggering state, a PHR based on the first indication, and sending the PHR to the access network device during the uplink transmission, wherein
the PHR comprises the first uplink frequency band index and a power headroom of the uplink frequency band identified by the first uplink frequency band index.

8. The method according to claim 1, wherein the method further comprises:
receiving, by the terminal, at least two second indications from the access network device, wherein each of the at least two second indications comprises a second uplink frequency band index and a transport block corresponding to an uplink frequency band identified by the second uplink frequency band index; and
performing, by the terminal, uplink transmission based on the at least two second indications, and transmitting, according to a preset rule or based on a configuration of the access network device, uplink control information on one of transport blocks comprised in the at least two second indications.

9. An apparatus comprising:
at least one processor;
a memory coupled to the processor and configured to store program instructions, the at least one processor being configured to execute the program instructions and cause the apparatus to:
receive, from an access network device, random access configurations corresponding to at least two uplink frequency bands,
wherein a center frequency of one of the at least two uplink frequency bands is different from center frequencies of all of remaining ones of the at least two uplink frequency bands,
wherein the random access configurations include a first random access configuration corresponding to a first uplink frequency band of the at least two uplink frequency bands and a second random access configuration corresponding to a second uplink frequency band of the at least two uplink frequency bands,
wherein the first random access configuration includes a first root sequence for generating a first preamble sequence, a first power ramp step for power control of the first preamble sequence, and a first maximum quantity of first preamble sequence transmissions, and
wherein the second random access configuration includes a second root sequence for generating a second preamble sequence, a second power ramp step for power control of the second preamble sequence, and a second maximum quantity of second preamble sequence transmissions; and
after receiving the random access configurations, initiate random access based on at least one of the random access configurations corresponding to the at least two uplink frequency bands,
wherein the at least one processor is configured to execute the program instructions and cause the apparatus to initiate the random access by:
determining, based on a downlink path loss status, to initiate random access based on one of the random access configurations corresponding to the at least two uplink frequency bands, the determining to initiate the random access including:
  obtaining a downlink path loss; and
  when the downlink path loss is greater than a path loss threshold, initiating the random access based on the first random access configuration, wherein the first random access configuration corresponds to the first uplink frequency band, the first uplink frequency band is any uplink frequency band in a first uplink frequency band group, the first uplink frequency band group comprises at least the first uplink frequency band, and a center frequency of each uplink frequency band in the first uplink frequency band group is less than a first preset threshold,
  the random access including:
    transmitting, by the apparatus to the access network device, a preamble sequence corresponding to one of the at least two uplink frequency bands, wherein the preamble sequence indicates a capability of the apparatus regarding a quantity of uplink frequency bands that can be supported by the apparatus.

10. The apparatus according to claim 9, wherein the at least one processor is configured to execute further instructions stored in the memory, to cause the apparatus to perform:
  when the downlink path loss is less than or equal to the path loss threshold, initiating the random access based on the second random access configuration, wherein the second random access configuration corresponds to the second uplink frequency band, the second uplink frequency band is any uplink frequency band in a second uplink frequency band group, the second uplink frequency band group comprises at least the second uplink frequency band, a center frequency of each uplink frequency band in the second uplink frequency band group is greater than a second preset threshold, and the second preset threshold is greater than the first preset threshold.

11. The apparatus according to claim 10, wherein the at least one processor is configured to execute the program instructions and cause the apparatus to initiate another random access based on a third random access configuration after the apparatus fails to initiate the random access based on the second random access configuration, wherein the third random access configuration corresponds to a third uplink frequency band, and the third uplink frequency band is any uplink frequency band in the first uplink frequency band group.

12. The apparatus according to claim 9, wherein the apparatus stores at least one time group of at least one cell, each of the at least one time group corresponds to one time amount, one timer, and at least one uplink frequency band, the at least one cell is a cell managed by the access network device, the time amount is used by the apparatus to perform uplink synchronization, and the timer is used to limit effective time of the time amount; and the processor executes further instructions stored in the memory, to cause the apparatus to perform:
  for any one of the at least one cell, stopping, when a timer corresponding to any time group of the cell expires, performing uplink transmission on an uplink frequency band corresponding to the time group; or
  for any one of the at least one cell, clearing, when timers corresponding to all time groups of the cell expire, a hybrid automatic repeat request buffer corresponding to the cell.

13. The apparatus according to claim 12, wherein the processor is configured to execute the program instructions and cause the apparatus to:
  when timers corresponding to all time groups of a primary cell in the at least one cell expire, clear a hybrid automatic repeat request buffer corresponding to another cell, in the at least one cell, other than the primary cell, and determining that timers corresponding to all time groups of the another cell expire; and
  receive a time amount adjustment command from the access network device, and starting, based on the time amount adjustment command, a timer corresponding to a first time group of a first cell, wherein the time amount adjustment command is used to instruct the apparatus to adjust the timer corresponding to the first time group of the first cell.

14. The apparatus according to claim 9, wherein the processor is configured to execute the program instructions and cause the apparatus to:
  receive a first indication from the access network device, wherein the first indication comprises a first uplink frequency band index and a transmission resource corresponding to an uplink frequency band identified by the first uplink frequency band index; and
  perform uplink transmission based on the first indication.

15. The apparatus according to claim 14, wherein the processor is configured to execute the program instructions and cause the apparatus to:
  generate, when the apparatus is in a power headroom report PHR triggering state, a PHR based on the first indication, and sending the PHR to the access network device during the uplink transmission, wherein the PHR comprises the first uplink frequency band index and a power headroom of the uplink frequency band identified by the first uplink frequency band index.

16. The apparatus according to claim 9, wherein the processor is configured to execute the program instructions and cause the apparatus to:
  receive, at least two second indications from the access network device, wherein each of the at least two second indications comprises a second uplink frequency band index and a transport block corresponding to an uplink frequency band identified by the second uplink frequency band index; and
  perform uplink transmission based on the at least two second indications, and transmitting, according to a preset rule or based on a configuration of the access network device, uplink control information on one of transport blocks comprised in the at least two second indications.

17. The method according to claim 1, wherein the receiving comprises:
  receiving the random access configurations in a radio resource control (RRC) message,
  and wherein the method further comprises:
  before the initiating the random access, selecting, by the terminal, the first random access configuration from the first random access configuration and the second random access configuration.

* * * * *